US010393908B2

(12) United States Patent
Santos et al.

(10) Patent No.: US 10,393,908 B2
(45) Date of Patent: Aug. 27, 2019

(54) BOBBIN CONSTRUCTION AND COIL WINDING METHOD

(71) Applicant: Rockwell Automation Technologies, Inc., Mayfield Heights, OH (US)

(72) Inventors: Roberto S. Santos, Hudson, MA (US); Yongyao Cai, Acton, MA (US); Boeun Uy, Lowell, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 161 days.

(21) Appl. No.: 15/380,029

(22) Filed: Dec. 15, 2016

(65) Prior Publication Data

US 2018/0174749 A1    Jun. 21, 2018

(51) Int. Cl.
*G01V 3/10* (2006.01)
*H01F 27/32* (2006.01)
*H01F 41/069* (2016.01)
*H01F 41/076* (2016.01)

(52) U.S. Cl.
CPC .............. *G01V 3/10* (2013.01); *H01F 27/325* (2013.01); *H01F 41/069* (2016.01); *H01F 41/076* (2016.01)

(58) Field of Classification Search
CPC .... H01F 41/125; H01F 41/069; H01F 41/076; H01F 27/325; G01V 3/10; G01D 5/20
See application file for complete search history.

(56) References Cited

U.S. PATENT DOCUMENTS

| 3,743,853 | A | * | 7/1973 | Dittman | G01V 3/102 307/116 |
| 3,786,562 | A | * | 1/1974 | Ciszewski | H01F 5/00 29/445 |
| 4,041,430 | A | * | 8/1977 | Hrynewycz | H01F 5/02 335/278 |
| 4,105,985 | A | * | 8/1978 | Plunkett | H01F 5/04 336/192 |

(Continued)

FOREIGN PATENT DOCUMENTS

| EP | 0161124 A1 * | 11/1986 | G01D 5/244 |
| EP | 0385575 A2 * | 9/1990 | G01V 3/101 |

(Continued)

*Primary Examiner* — Jermele M Hollington
*Assistant Examiner* — Sean Curtis
(74) *Attorney, Agent, or Firm* — Amin, Turocy & Watson, LLP

(57) ABSTRACT

A bobbin for holding inductive coils includes features that yield a smaller overall size and prevent irregular and asymmetric coil windings. The bobbin comprises a central hub and a single flange that extends from a middle circumference of the hub. The bobbin includes no end flanges at the ends of the central hub, reducing the height of the bobbin. The interface between the flange and the hub is a sharp corner with little or no radius, facilitating regular and symmetrical coil geometries. Coil assemblies can be attached to the respective two sides of the flange concentrically with the hub. Each coil assembly can be formed by winding a transmitter coil, then winding a receiver coil concentrically over the transmitter coil. Conductive pins that extend from the outer edge of the flange interface the coil lead wires to a printed circuit board of an inductive sensor or other device.

22 Claims, 36 Drawing Sheets

(56) References Cited

U.S. PATENT DOCUMENTS

| | | | | |
|---|---|---|---|---|
| 4,122,424 A * | 10/1978 | Plunkett | | H01F 5/04 336/107 |
| 4,672,348 A * | 6/1987 | Duve | | H01F 5/04 336/192 |
| 4,715,233 A * | 12/1987 | Neven | | G01F 1/586 336/198 |
| 4,825,166 A * | 4/1989 | MacGugan | | G01R 33/045 29/606 |
| 5,264,733 A | 11/1993 | Tigges | | |
| 5,293,146 A * | 3/1994 | Aosaki | | H01F 27/323 156/56 |
| 5,626,491 A | 5/1997 | Hasircoglu | | |
| 5,657,208 A | 8/1997 | Noe et al. | | |
| 5,689,182 A * | 11/1997 | Togo | | G01D 11/245 29/602.1 |
| 5,796,324 A * | 8/1998 | Ross | | H01F 27/292 174/84 S |
| 5,814,986 A * | 9/1998 | Goskowicz | | G01B 7/023 29/606 |
| 6,046,583 A * | 4/2000 | Ayres | | G01R 7/06 324/144 |
| 6,190,214 B1 | 2/2001 | Bianca et al. | | |
| 6,344,786 B1 * | 2/2002 | Chin | | H01F 27/06 336/192 |
| 6,518,870 B2 * | 2/2003 | Yeh | | H01F 27/325 336/198 |
| 6,625,849 B1 | 9/2003 | Womack et al. | | |
| 6,657,323 B2 | 12/2003 | Muller | | |
| 6,659,384 B2 * | 12/2003 | Milanese | | B65H 59/04 242/419.3 |
| 6,700,079 B2 | 3/2004 | Bogursky et al. | | |
| 7,037,139 B1 | 5/2006 | Stefaniu et al. | | |
| 7,289,012 B2 * | 10/2007 | Tran-Ngoc | | H01F 5/04 336/90 |
| 7,446,642 B2 * | 11/2008 | Fang | | H01F 17/04 336/198 |
| 7,463,020 B2 | 12/2008 | Kuhn | | |
| 7,864,976 B2 * | 1/2011 | Kitazawa | | H04R 3/002 29/595 |
| 8,441,251 B2 | 5/2013 | Thoss et al. | | |
| 8,746,608 B2 * | 6/2014 | Weissbrod | | B21C 47/323 242/476.6 |
| 8,849,421 B2 | 9/2014 | Bondhus et al. | | |
| 8,910,499 B2 * | 12/2014 | De Franceschi | | G01G 15/00 242/899 |
| 9,714,877 B2 * | 7/2017 | Nakamura | | G01L 3/103 |
| 9,823,274 B2 * | 11/2017 | Lint | | G01R 15/181 |
| 10,145,873 B2 * | 12/2018 | Wang | | G01R 27/2611 |
| 2005/0225418 A1 | 10/2005 | Tran-Ngoc | | H01F 5/04 336/198 |
| 2006/0290481 A1 * | 12/2006 | Kitazawa | | H04R 3/002 340/426.34 |
| 2007/0107207 A1 * | 5/2007 | LaClair | | H03K 17/9505 29/602.1 |
| 2007/0254522 A1 | 11/2007 | Libby | | |
| 2008/0129157 A1 * | 6/2008 | Nakano | | B62J 6/12 310/67 A |
| 2011/0109416 A1 | 5/2011 | Hsiao et al. | | |
| 2012/0242352 A1 | 9/2012 | Gong et al. | | |
| 2013/0161430 A1 * | 6/2013 | Weissbrod | | B21C 47/323 242/118.4 |
| 2014/0300255 A1 | 10/2014 | Sugiyama et al. | | |
| 2014/0300350 A1 * | 10/2014 | Teppan | | G01R 15/185 324/244 |
| 2015/0377940 A1 * | 12/2015 | Wang | | G01R 27/2611 324/654 |
| 2016/0027575 A1 * | 1/2016 | Yan | | H01F 17/043 336/84 C |
| 2016/0305833 A1 * | 10/2016 | Nakamura | | G01L 3/103 |
| 2018/0174749 A1 | 6/2018 | Santos | | H01F 41/125 |

FOREIGN PATENT DOCUMENTS

| | | | | |
|---|---|---|---|---|
| EP | 0385575 A3 * | 8/1991 | | G01V 3/101 |
| WO | WO-2007131373 A1 * | 11/2007 | | G01D 11/245 |

* cited by examiner

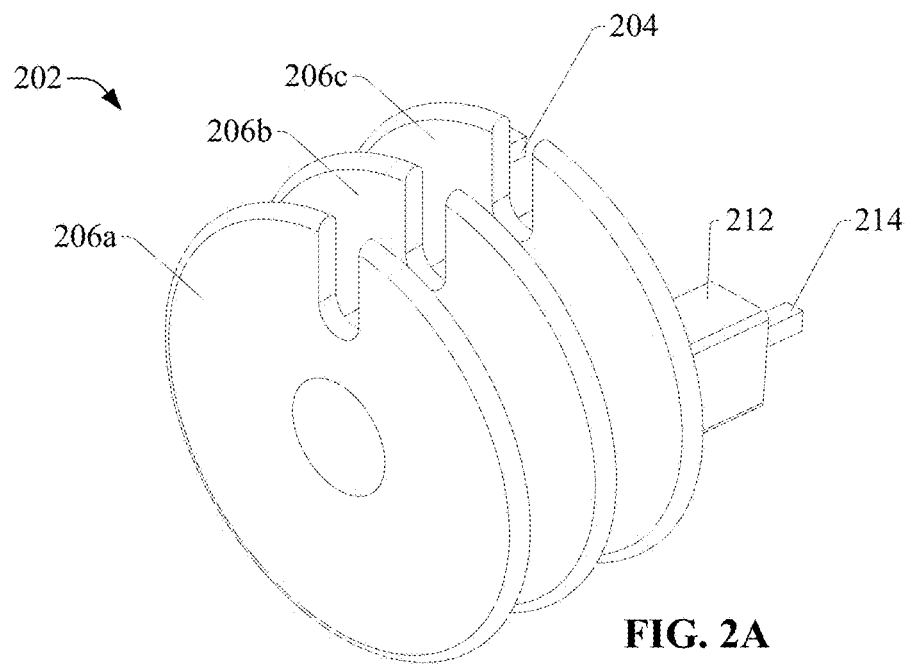
FIG. 2A
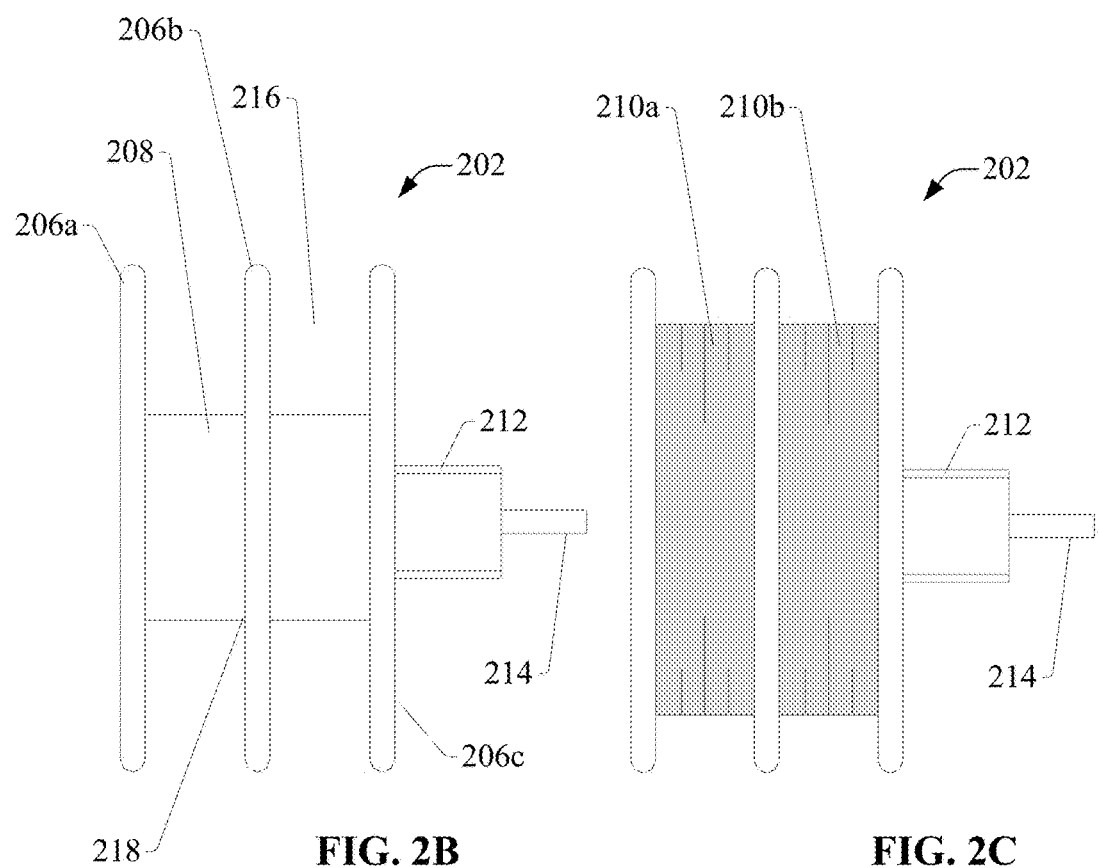
FIG. 2B  FIG. 2C

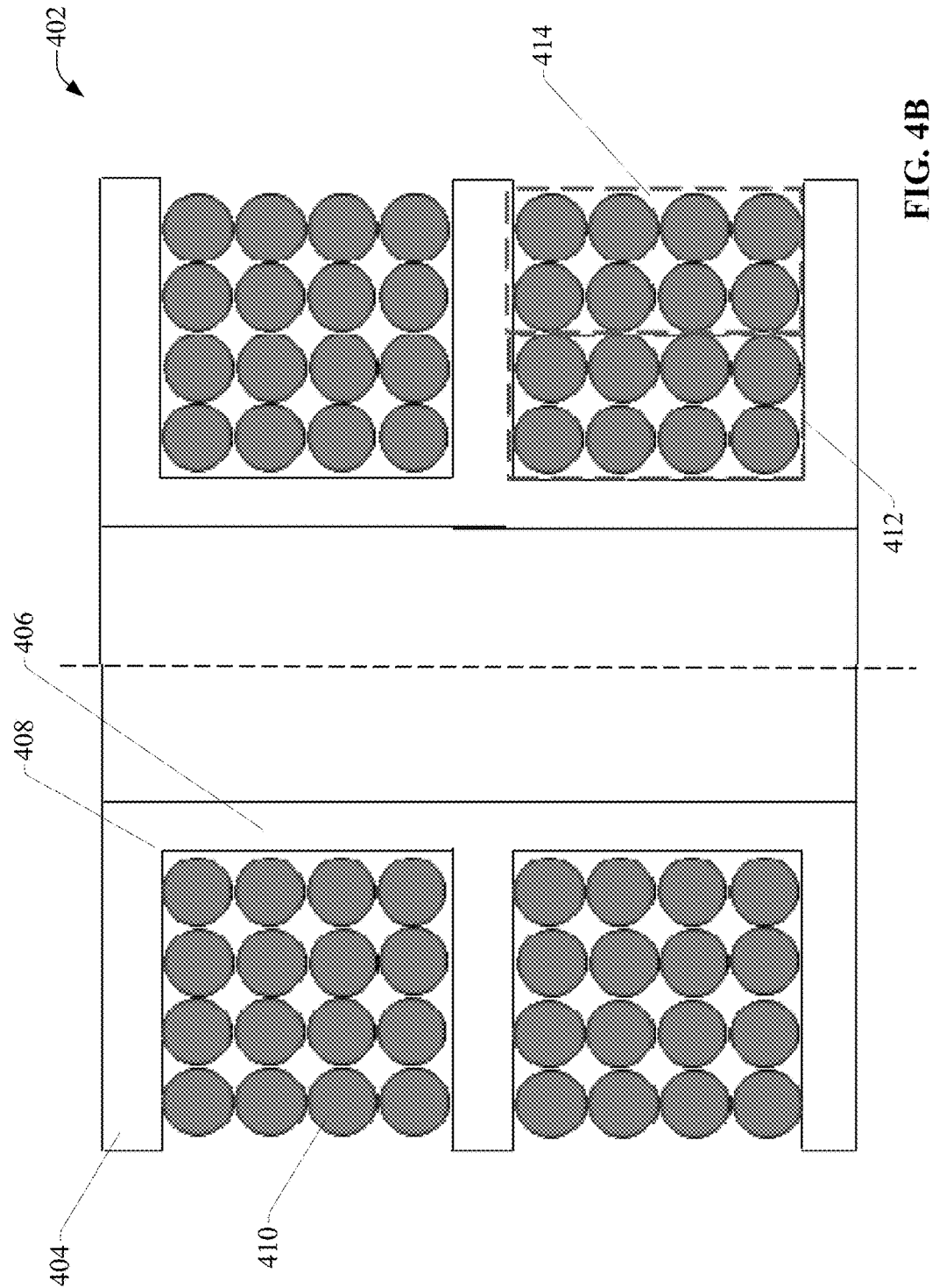

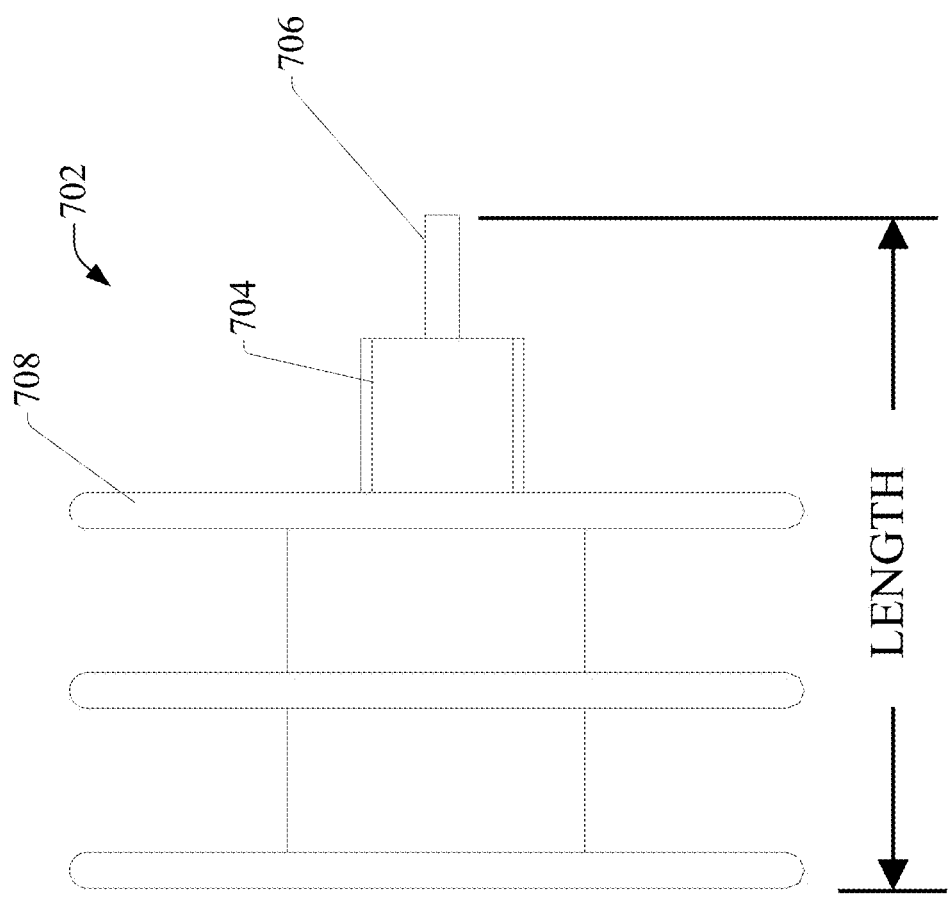

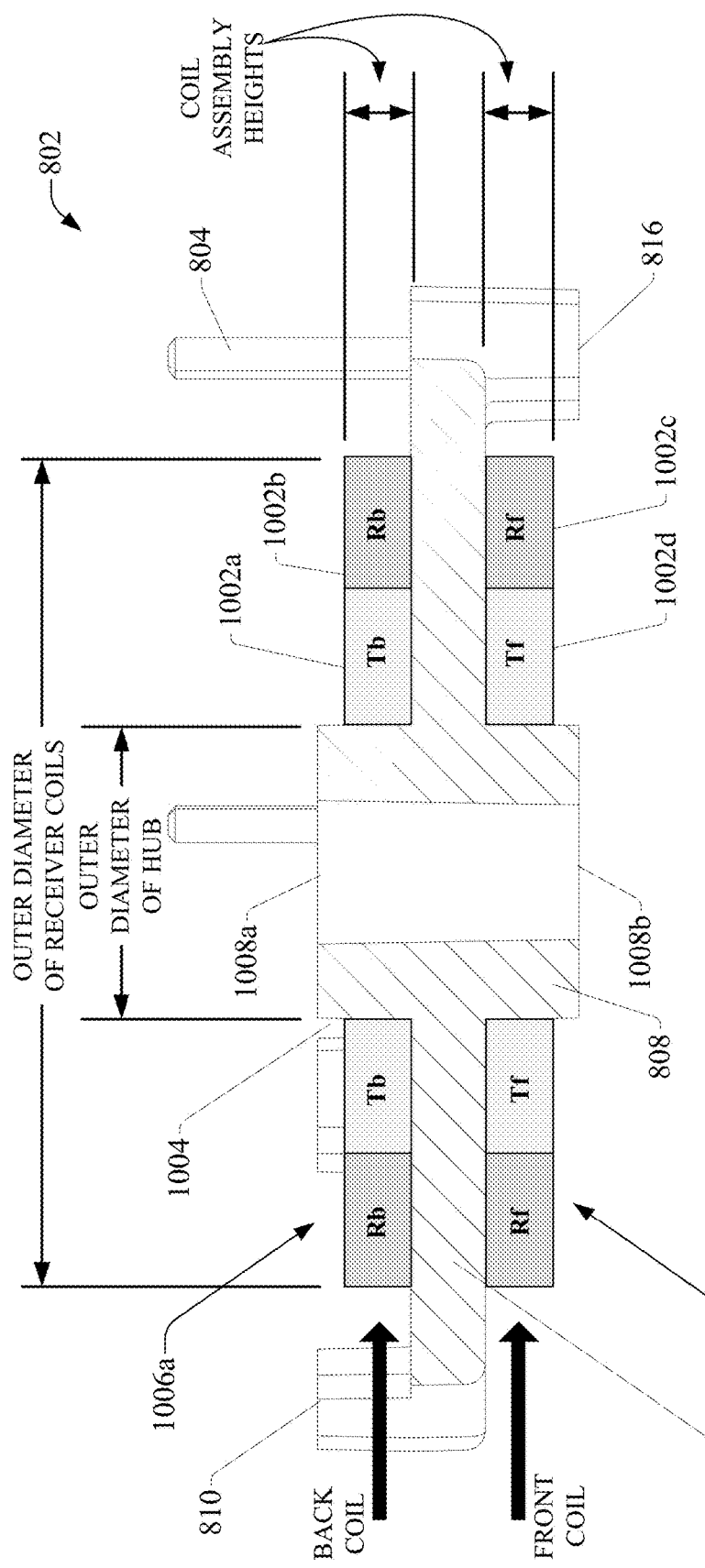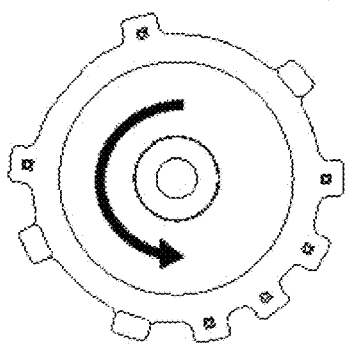
FIG. 10A
FIG. 10B

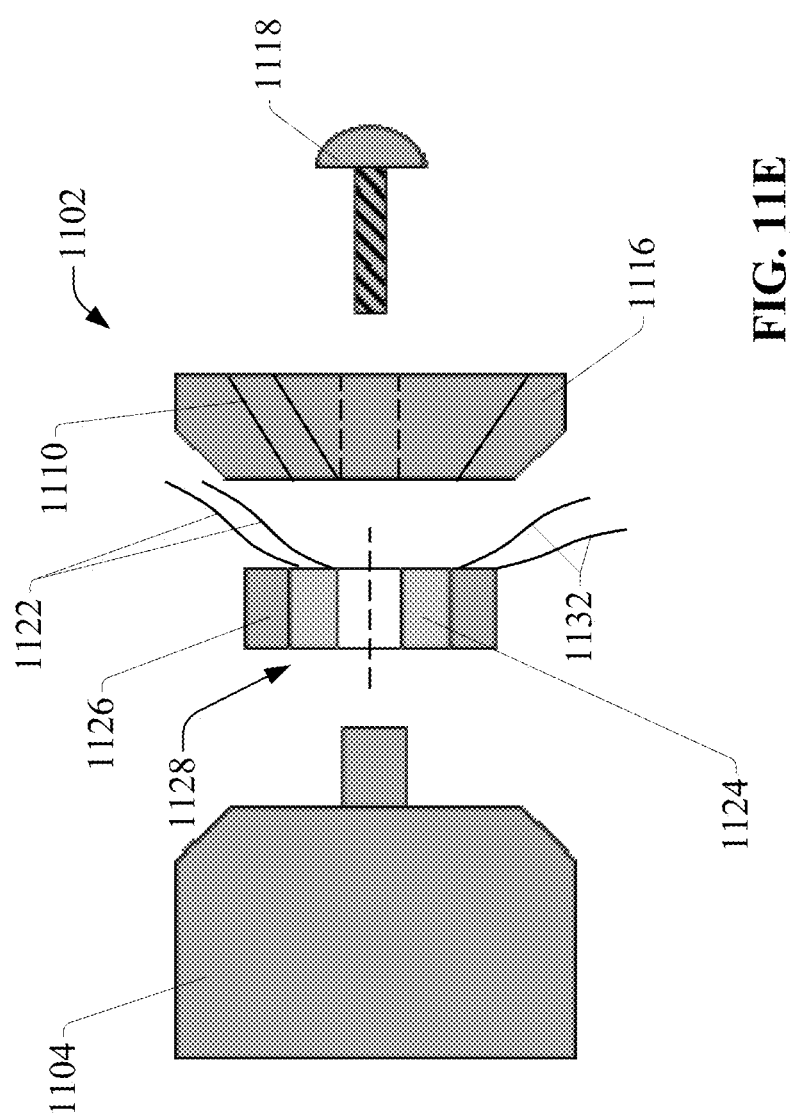

BOBBIN CONSTRUCTION AND COIL WINDING METHOD

BACKGROUND

The subject matter disclosed herein relates generally to inductive sensors, and, more particularly, to installation and management of inductive sensor coil assemblies.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, an assembly for supporting inductive coils is provided, comprising a bobbin comprising a central hub, and a single flange that extends radially from the central hub.

A method is also described, the method comprising winding a transmitter coil; winding a receiver coil concentrically over the transmitter coil to yield a coil assembly; and attaching the coil assembly to a bobbin to yield a bobbin/coil assembly, wherein the bobbin comprises a central hub and a single flange that extends radially from the central hub.

Also, an inductive sensor is provided, comprising a sensor housing; a printed circuit board comprising one or more electrical components of the inductive sensor; a bobbin installed between an inside surface of the sensor housing and the printed circuit board, the bobbin comprising a central hub and a single flange that extends radially from the central hub; and at least one coil assembly installed on the bobbin.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 2A is a three-dimensional view of an example conventional bobbin.

FIG. 2B is a side view of an example conventional bobbin.

FIG. 2C is a side view of an example conventional bobbin in which two separate coils are wound within two separate slots of the bobbin.

FIG. 4B is a cross-section view of an example conventional bobbin for a winding architecture in which two separate coils are wound within the same slot of the bobbin.

FIG. 7 is a side view of an example conventional bobbin that incorporates protrusions extending from the surface of one of the flanges that provide a place for the pin terminations to which the coil wires can be electrically connected.

FIG. 10A is a cross-sectional side view of a bobbin depicting coils mounted to the bobbin according to an example coil architecture.

FIG. 10B is a top view of an example bobbin illustrating the direction of the coil windings on the bobbin.

FIGS. 11A-11E are cross-sectional side views of an example coil winding arbor that can be used to wind a coil or coil assembly without the need for a bobbin.

DETAILED DESCRIPTION

Figure 1:
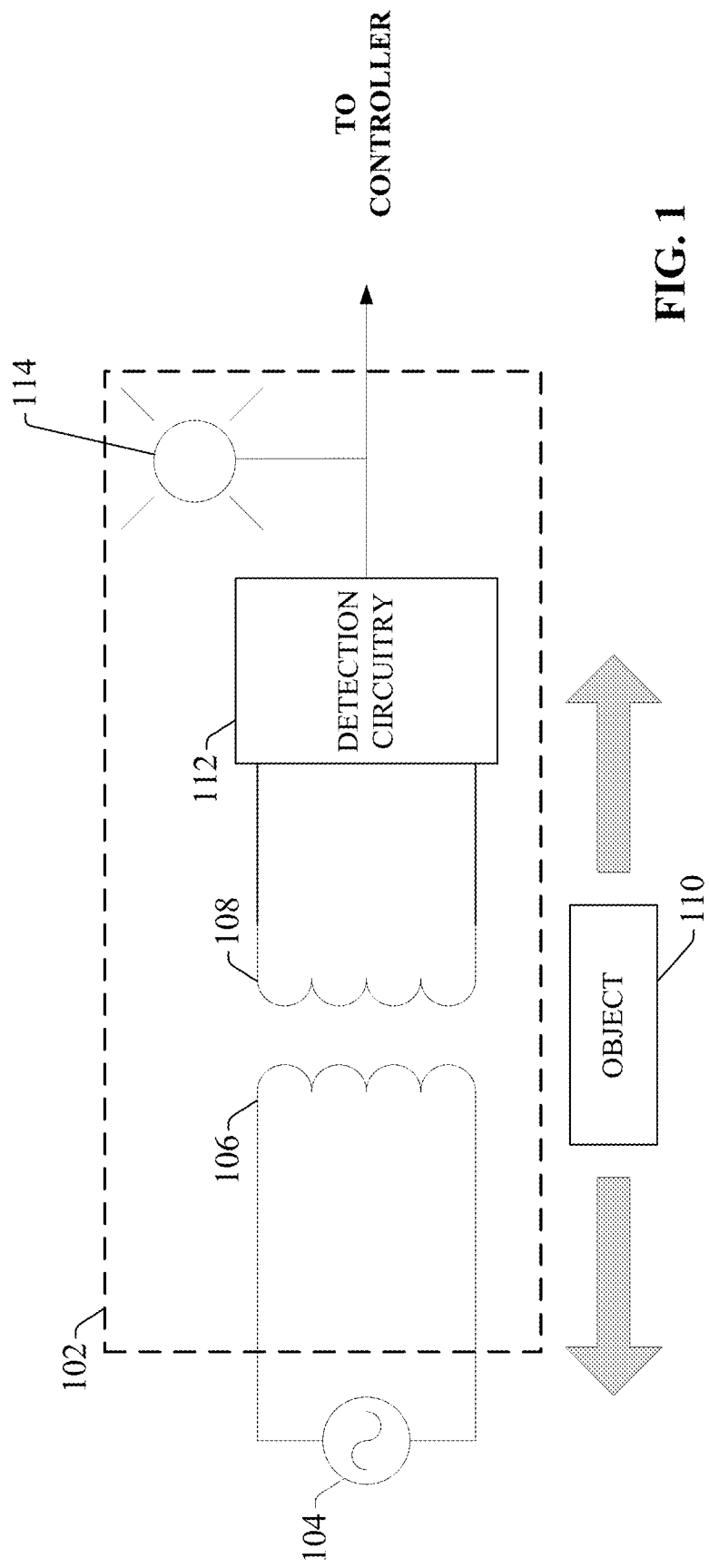
FIG. 1 is a generalized diagram of an example multi-coil inductive sensor.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of holes includes one or more holes; etc.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Many industrial applications utilize inductive sensors, such as proximity sensors, for detecting the presence of metal objects near the sensors. In some industrial applications, proximity switches are often mounted at key locations on a conveyor system to detect when a part is present at that location. In another example, proximity switches may be mounted at the extreme ends of travel of an actuating component (e.g., a pneumatic cylinders, a clamp, etc.) to confirm when the actuating component has moved to a desired position (e.g., fully retracted, fully extended, clamped, unclamped, etc.).

FIG. 1 is a generalized diagram of an example multi-coil inductive sensor. Inductive sensor 102 comprises a transmitter coil 106 and receiver coil 108. Although example inductive sensor 102 depicts only a single transmitter coil and receiver coil, some inductive sensors may include multiple transmitter coils and/or receiver coils. An alternating current (AC) voltage or current source 104 (e.g., a sinusoidal or periodic voltage or current) is connected to transmitter coil 106, causing the transmitter coil 106 to generate an oscillating magnetic field that induces a current on receiver coil 108. Detection circuitry 112 monitors the induced current on receiver coil 108.

The transmitter coil 106 is generally located within the inductive sensor 102 such that the oscillating magnetic field is created in proximity of a sensing face of the sensor, where the strength of the magnetic field is strongest in the axis of the sensor perpendicular to the sensing face. When an electrically conductive metal object 110 (e.g., a ferrous or non-ferrous metal target object) is located near the sensing surface in the axis of the sensor coils or the magnetic field, the presence of the object within the field induces eddy currents in the target, resulting in a loss of energy and a smaller amplitude of oscillation induced on the receiver coil 108. Detection circuitry 112 is configured to generate an output in response to detecting that the induced current on receiver coil 108 has been modified in a manner indicative of the presence of object 110 (e.g., by determining that the amplitude of the induced current has fallen below or increased above a threshold indicative of the presence of a metal object in proximity to the sensing surface). For some types of sensors, such as proximity switches, the sensor may generate a discrete solid-state output indicating the presence of object 110 (e.g., by switching the output signal to the ON or OFF state). Other types of sensors may be configured to measure a distance of the object from the sensing surface. Such sensors may be configured to generate an analog value that is a function of the distance of the object 110 from the sensing surface. The output may be delivered to an industrial controller and used as an input for a control program. Some sensors may also include an LED 114 mounted on the sensor body that illuminates when the object 110 is detected.

In some sensor designs, the transmitter coils and receiver coils are wound around a multi-coil bobbin or other structure within the sensor. FIG. 2A is a three-dimensional view of an example conventional bobbin 202, and FIG. 2B is a side view of example bobbin 202. Bobbin 202 consists of a plurality of flanges 206 affixed to a center hub 208. The example bobbin 202 depicted in FIGS. 2A and 2B, include a center flange 206b and two end flanges 206a and 206c. Notches 204 are formed in each flange 206. The notch 204 in one of the outermost end flanges 206a or 206c serves to aid in fixing the bobbin 200 to a winding machine and to prevent the bobbin 202 from rotating during the coil winding operation in which the transmitter and receiver coils are wound on the bobbin 202. The notches 204 in the remaining flanges 206 serve to provide a path for the coil wires to pass through so that the coil wires can be terminated to a printed circuit board (PCB) or to metal terminal pins 214 that protrude from legs 212 formed on one of the end flanges 206c in order to provide a means of electrically connecting the coil wires (e.g., via soldering or tin dipping). The terminal pins 214 may be overmolded or press fit into the bobbin 202, and in some designs may be made of phosphor bronze, brass, or oxygen-free copper.

FIG. 2B is a side view of bobbin 202 before winding, and FIG. 2C is a side view of bobbin 202 after winding coils 210 into respective slots 216 defined by the flanges 206 and the center hub 208. The flanges 206 serve to constrain the strands of loose copper wire that are wound between them to produce a coil (e.g., coils 210a and 210b) and serve to separate the different coil windings. The copper wire may be a solid strand (e.g., magnet wire) or made up of several twisted strands (e.g., litz wire). The inner diameter of the coils 210—that is, the diameter of the center hole around which the coils are turned—is established by the outer diameter of the center hub 208, and the outer diameter of the coils 210 is less than the outer diameter of the flanges 206. In various designs, bobbins may be made from a variety of thermoplastic polymer materials, including but not limited to liquid crystal polymer (LCP), nylon, polybutylene terephthalate (PBT), polyethylene terephthalate (PET), and polyphenylene sulfide (PPS) or thermoset polymer materials including diallyl phthalate (DAP), phenolic, or thermosetting polyester.

Generally accepted injection molding plastic part design guidelines recommend that all sharp corners—e.g., the corner 218 formed by the interface between the hub 208 and flange 206b—be broken with a minimum 0.005 inch radius to avoid stress concentrations in the part. However, in some cases the diameter of the coil wire may be much smaller than the minimum 0.005 inch radius of corner 218. For example, for a coil wire with a 0.00275 inch diameter, the radius of a corner 218 of the bobbin 202 should be no larger than 0.00137 inches, which is half the diameter of the coil wire. As this radius is much smaller than the recommended minimum 0.005 inch radius, there will be unavoidable disruptions in the coil winding.

Figure 3A:
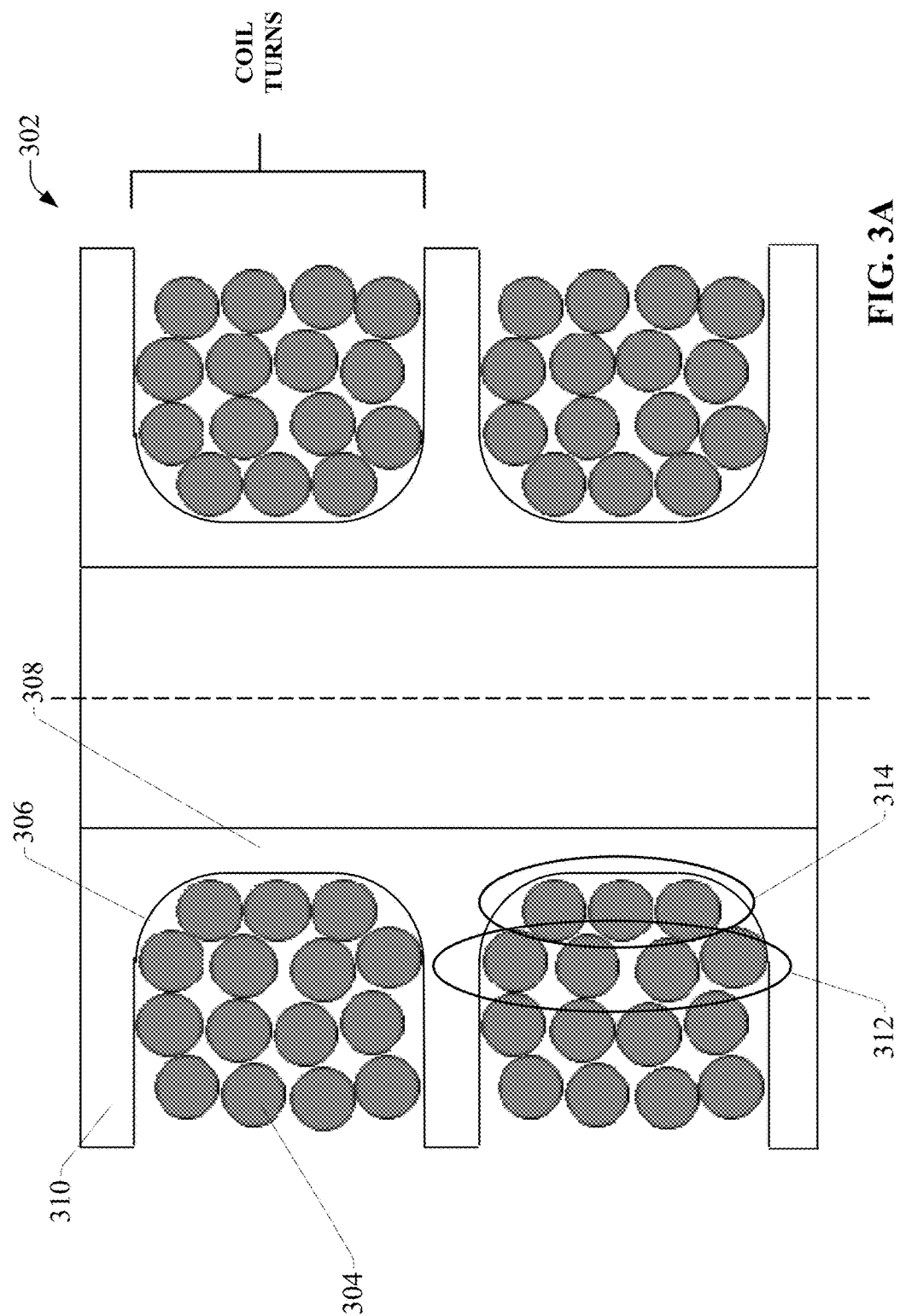
FIG. 3A is a cross-section view of an example conventional bobbin having a radius corner at the interface between the center hub and flanges.
Figure 3B:
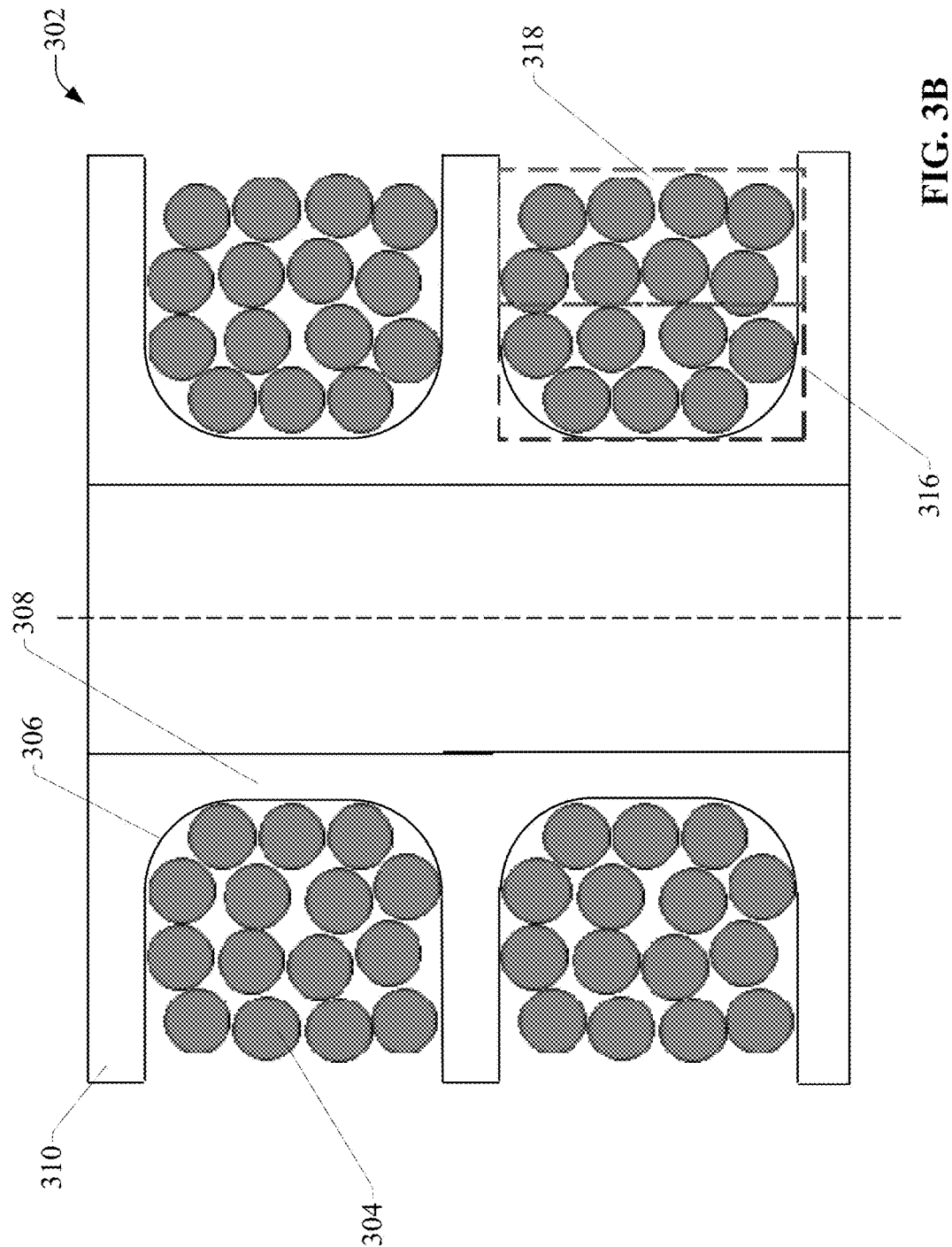
FIG. 3B is a cross-section view of an example conventional bobbin having a radius corner at the interface between the center hub and flanges for a winding architecture in which two separate coils are wound within the same slot of the bobbin.

FIG. 3A is a cross-section view of an example conventional bobbin 302 illustrating how the coil wires can form an irregular coil winding when there is a radius at the interface 306 between the flange 310 and center hub 308. As can be seen in this figure, the number of coil turns 304 goes from three wire turns initially (the three turns 314 adjacent to center hub 308) to four wire turns (turns 312) due to the radii at the interfaces 306. As can also be seen, the radii at the interfaces 306 can prevent the turns 304 from aligning with one another. FIG. 3B is a cross-section view of bobbin 302 for a winding architecture in which two separate coils—an inner coil 316 and an outer coil 318—are wound within the same slot of the bobbin. As can be seen in this figure, the irregularity and asymmetry of the winding turns 304 of the inner coil 316, which are cause by the radius of the interface 306, are propagated from the inner coil 316 to the outer coil 318. Also, because the outer coil 318 uses the outer diameter of the inner coil 316 as a starting point, any irregularity in the outer diameter of the inner coil 316 will yield an irregular surface on which to wind the outer coil 318, resulting in further irregularity and asymmetry between the coil windings. Moreover, the irregularity of the coil windings can produce voids, or irregularly large spaces between some sets of adjacent turns, particularly when copper magnet wire or litz wire is used for the coils.

Figure 4A:
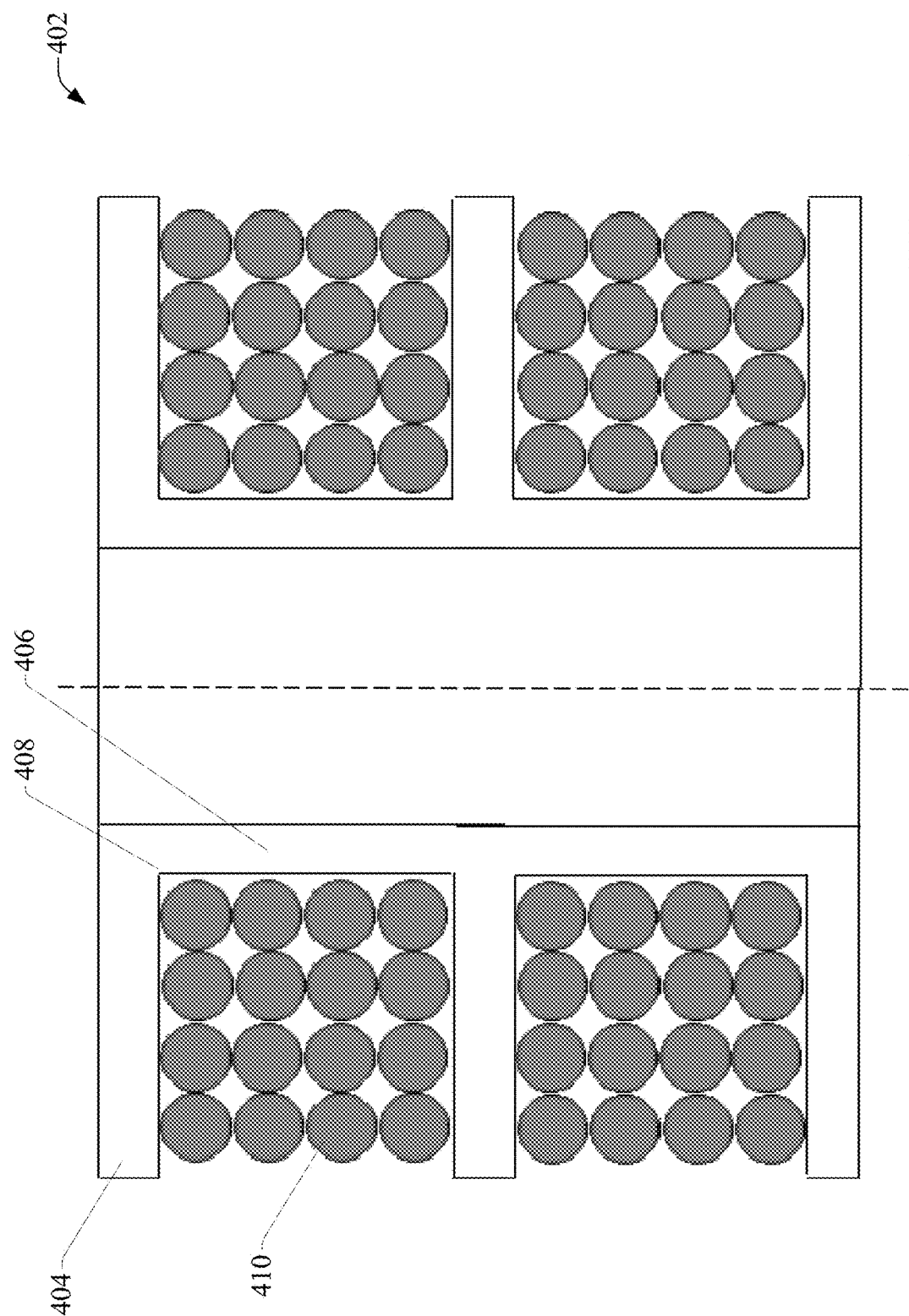
FIG. 4A is a cross-section view of an example conventional bobbin having a sharp corner at the interface between the center hub and the flanges.

FIG. 4A is a cross-section view of an example conventional bobbin 402 having a sharp corner at the interface 408 between the center hub 406 and flanges 404. When the interface 408 comprises a sharp corner, rather than the larger radius depicted in FIGS. 3A and 3B, the coil wires can be more easily wound to form a uniform, symmetric coil winding. In this example design, each layer of coil wires comprises an equal number of turns 410, and each turn 410 is aligned with a corresponding turn in an adjacent layer. FIG. 4B is a cross-section view of bobbin 402 for a winding architecture in which two separate coils—an inner coil 412 and an outer coil 414—are wound within the same slot of the bobbin 402. As can be seen, the uniformity and symmetry of the turns of inner coil 412 are propagated to the outer coil 414. Also, because the outer coil 414 uses the diameter of the inner coil 412 as a starting point, the uniformity of the outer diameter of the inner coil 412 will provide a uniform surface on which to wind the outer coil 414, resulting in greater uniformity and symmetry between the coil windings.

Figure 5A:
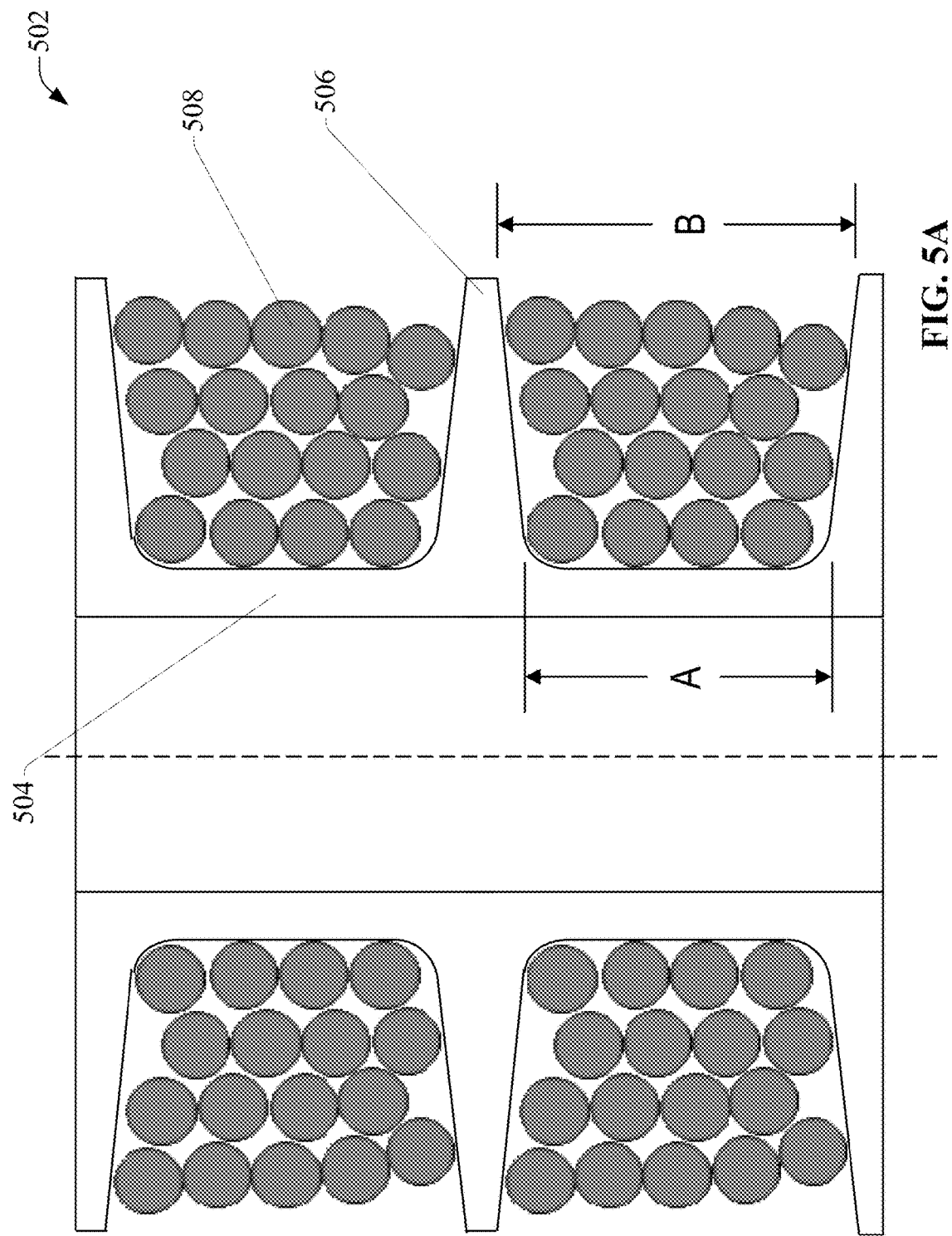
FIG. 5A is a cross-section view of an example conventional bobbin illustrating draft.

FIG. 5A is a cross-section view of an example conventional bobbin 502 illustrating draft. Generally accepted injection molding plastic part design guidelines require that the surfaces of the part in the line of draw of the die (along the direction in which the injection molding tool "pulls" or separates) be drafted such that a taper is applied to those surfaces. Drafting the surfaces facilitates the release of the part from the injection mold. As a result, the width of the slot at the bottom of the flanges 506 at the center hub 504 (labeled dimension 'A' in FIG. 5A) will be less than the width of the slot at the top of the flanges 506 (labeled dimension 'A' in FIG. 5A). This difference in the width of the slot results in fewer wire turns 508 near the bottom of the slot and more wire turns 508 near the top of the slot. This also causes the shape of the coil windings to be trapezoidal. In architectures in which each slot contains two coils, the profile of the inner coil will be a smaller trapezoid and the profile of the outer coil will be a larger trapezoid, producing an inherent asymmetry between the coils that could adversely affect performance. In the example depicted in FIG. 5A, the number of turns 508 increases from four turns to five turns from the center hub 504 towards the tip of the flanges 506. The shape of the slots also prevents the turns from aligning symmetrically.

Figure 5B:
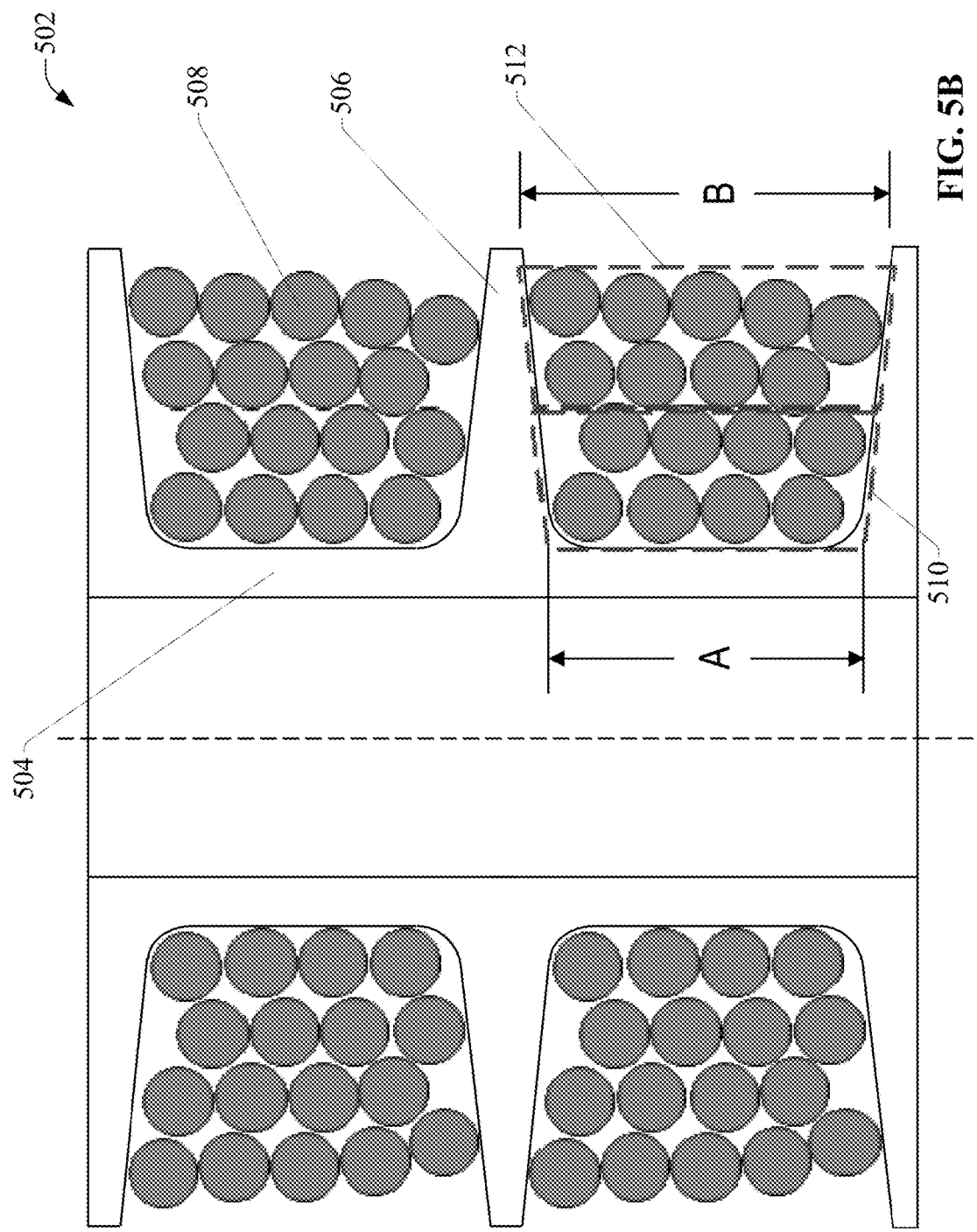
FIG. 5B is a cross-section view of an example conventional bobbin illustrating draft for a winding architecture in which two separate coils are wound within the same slot of the bobbin.

FIG. 5B is a cross-section view of an example conventional bobbin 502 for a winding architecture in which two separate coils—an inner coil 510 and an outer coil 512—are wound within the same slot of the bobbin 502. Since the sides of the flanges 506 that form the slots in which the coils are wound are tapered, the profiles of inner coil 510 and outer coil 512 are trapezoidal, with inherent irregularity and asymmetry of the coil windings in terms of geometric shape as well as uniformity of the wire turns. Also, because the outer coil 512 uses the outer diameter of the inner coil 510 as a starting point, any irregularity in the outer diameter of the inner coil 510 will yield an irregular surface on which to wind the outer coil 512, resulting in further irregularity and asymmetry between the coil windings.

Figure 6B:
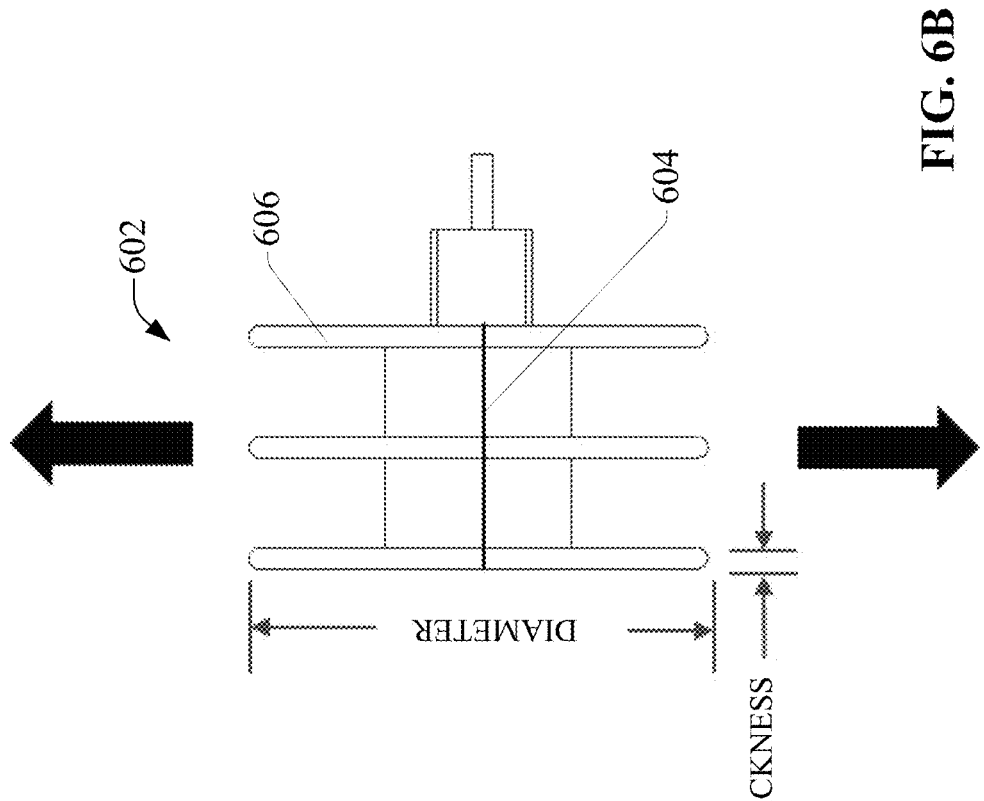
FIG. 6B is a side view of a three-dimensional view of an example conventional bobbin having a parting line.
Figure 6A:
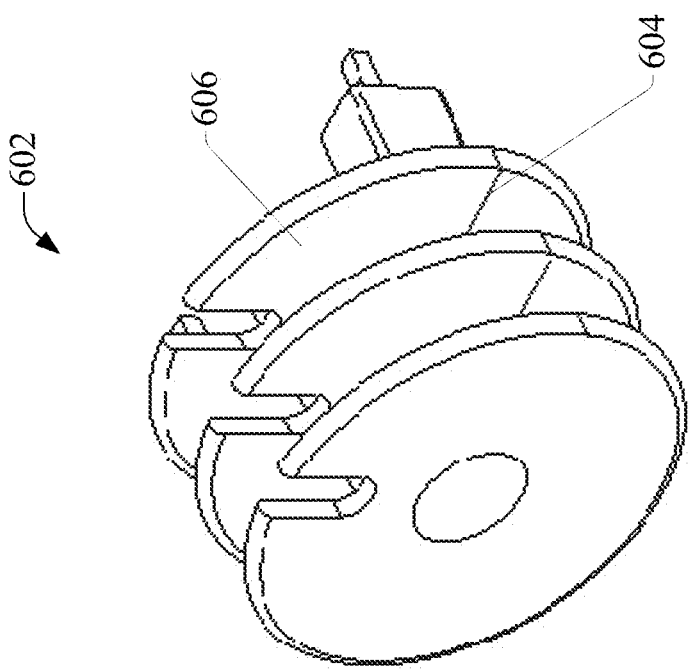
FIG. 6A is a three-dimensional view of an example conventional bobbin having a parting line.

Structural artifacts formed on the bobbin as a result of the manufacturing process, such as parting lines, can also introduce irregularities in the coil windings. FIG. 6A is a three-dimensional view of an example conventional bobbin 602 having a parting line 604, and FIG. 6B is a side view of bobbin 602. Due to the geometry of the conventional bobbin 602 and the conventional mold injection process used to form the bobbin 602, a parting line 604 may be present along the flanges and center hub, located along a line where the two halves of the injection molding tool come together during the molding process (the arrows in FIG. 6B represent the directions in which the two halves of the injection molding tool are pulled apart from one another). The parting line 604 may be caused by a slight mismatch between the two halves of the tool, which appears as a small step along the parting line 604. There is also a likelihood of flash being produced along the parting line 604. Flash is an artifact of the injection molding process whereby some of the plastic resin squeezes through small gaps between the two halves of the injection molding tool. The flash appears as a thin, raised protrusion along the parting line 604. The presence of a parting line 604 and its associated defects (parting line mismatch and flash) can prevent the coil windings from sitting flat against the flange 606 and, as a result, produce an irregular coil winding density and shape, which may have a negative impact on coil performance.

FIG. 7 is a side view of an example conventional bobbin 702 that incorporates protrusions 704 extending from the surface of one of the flanges 708. Terminal pins 706, to which the coil wires can be electrically connected (e.g. soldered), extend from the protrusions 704. The protrusions 704 and terminal pins 706 add to the overall length of the bobbin 702, making it difficult to fit the assembly into small inductive proximity sensors.

Figure 8A:
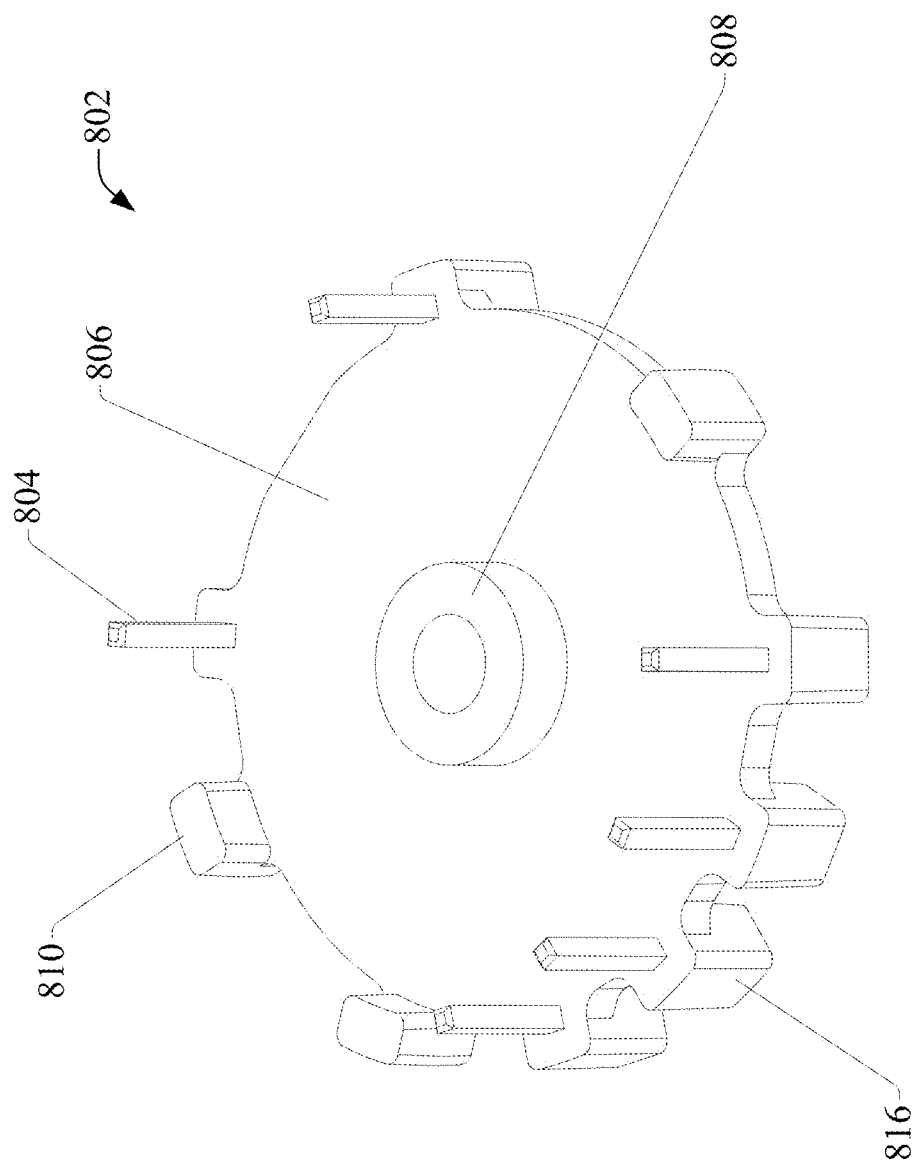
FIG. 8A is a three-dimensional view of an example bobbin comprising a central hub and a single flange.
Figure 8B:
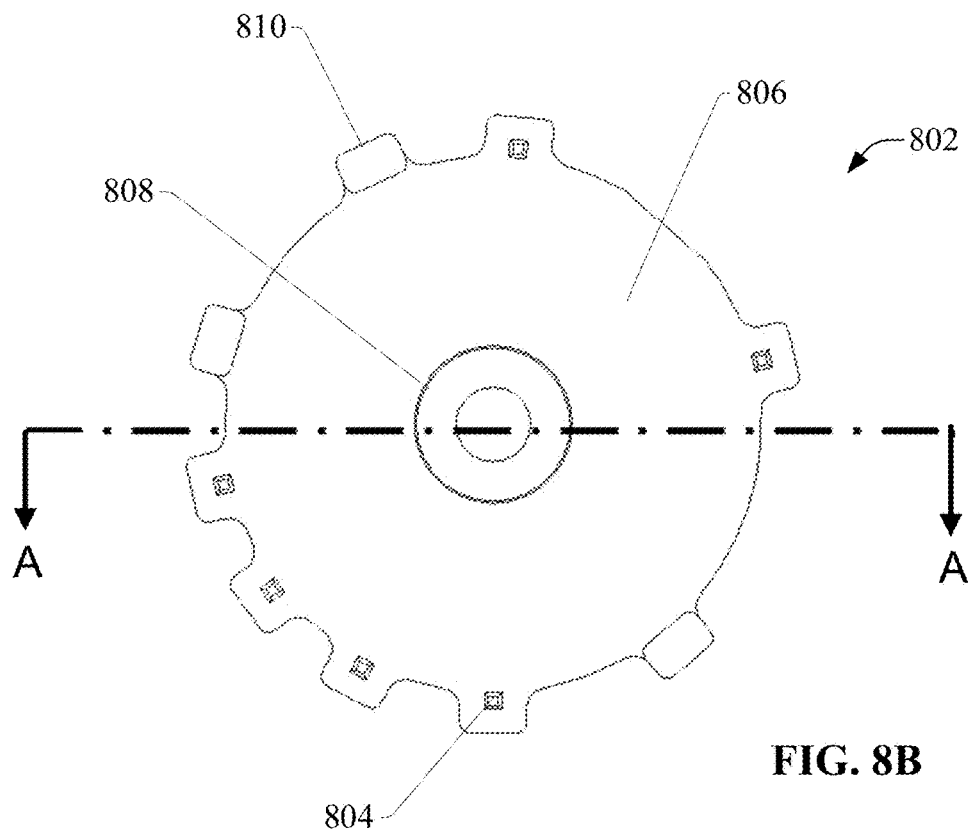
FIG. 8B is a top view of an example bobbin comprising a central hub and a single flange.
Figure 8C:
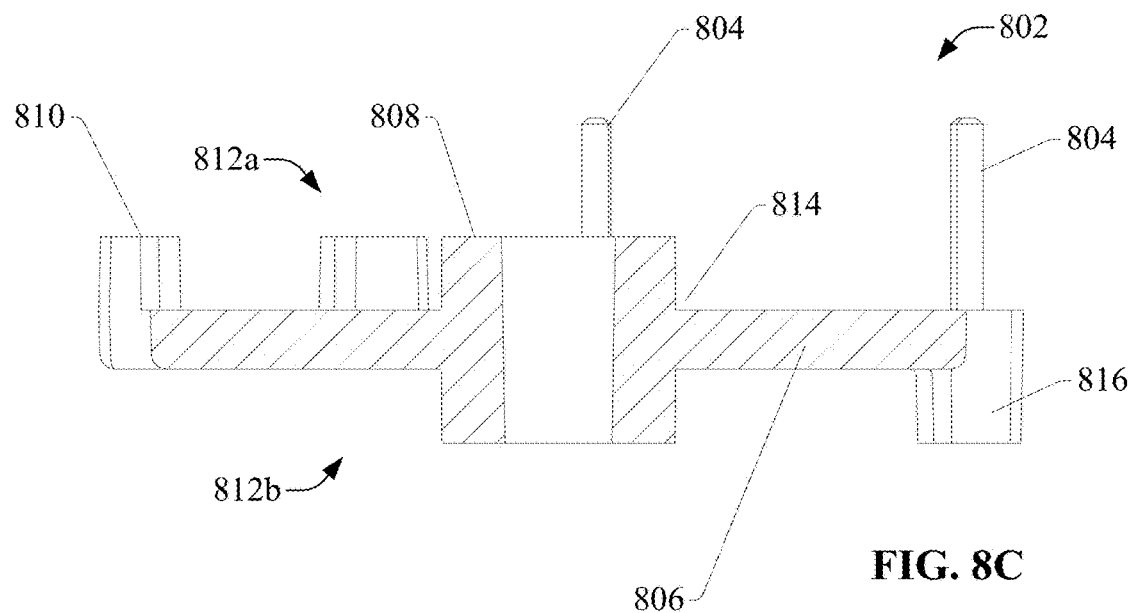
FIG. 8C is a cross-sectional side view of an example bobbin comprising a central hub and a single flange.

To address these and other issues, one or more embodiments described herein provide a new bobbin design and coil winding method. FIG. 8A is a three-dimensional view of an example bobbin 802 according to one or more embodiments described herein. FIG. 8B is a top view of bobbin 802, and FIG. 8C is a cross-sectional side view of bobbin 802. The bobbin 802 can be made from any suitable material, including but not limited to a thermoplastic or thermoset polymer resin with a suitably low coefficient of thermal expansion (CTE). Suitable thermoplastic polymers can include, but are not limited to, liquid crystal polymer (LCP) with a CTE of approximately 10-20 μm/m/° C. or polyether ether ketone (PEEK) with a CTE of approximately 50 μm/m/° C. Suitable thermoset polymers can include, but are not limited to, bakelite (such as Sumitomo Bakelite PM-9630 JT) with a CTE of approximately 23 μm/m/° C.

Bobbin 802 consists of a central hub 808 with a single flange 806 protruding radially outward from the middle (or approximate middle) circumference of the hub 808. The flange 806 interfaces with the central hub 808 along a hub circumference half way or approximately half way between the two extreme ends of the central hub 808. In contrast to conventional bobbins, bobbin 802 includes no end flanges at or near the ends of central hub 808. Eliminating the conventional end flanges yields a reduced overall height that allows bobbin 802 to be fit more easily into small enclosures relative to conventional bobbins. Bobbin 802 is designed to allow coil assemblies to be wound or otherwise installed on either side of the flange 806 (sides 812*a* and 812*b*).

The thickness of the flange 806 determines the spacing between the two coil assemblies. As the thickness of the flange 806 increases, the coil assemblies are positioned further apart. Spacing the coil assemblies farther apart can yield a stronger signal, but may also increase the negative influence of surrounding metals. On the other hand, as the thickness of the flange 806 decreases, the coils are positioned closer together. Reducing the spacing between the coils can reduce surrounding metal effects, but with a possible decrease in signal response from the intended target. The thickness of the center flange 806 is thus a tradeoff between target response and surrounding metal influences.

As can be seen most clearly in FIG. 8C, there is a sharp corner 814 at the interface between the central hub 808 and flange 806, thereby reducing or eliminating winding irregularities that a radius would otherwise create. This sharp corner 814 also allows the coil assemblies to sit flat against the flange 806, since the inner diameter of the coil assembly will be only slightly larger than the outer diameter of the bobbin's central hub. The tight clearance between the bobbin's central hub 808 and the coil assembly's inner diameter facilitates precise axial alignment between the two coil assemblies, thereby reducing the possibility of degradation of the sensor's temperature stability and surrounding metal performance that can result from misalignment of the coils.

In the example depicted in FIGS. 8A-8C, bobbin 802 has six legs 816 located at or near the outer edge or perimeter of the flange 806. Positioning the legs 816 around the outer perimeter of the flange 806 results in an overall reduction in the bobbin's overall length, allowing bobbin 802 to be fit into smaller enclosures relative to conventional bobbins. Each leg 816 protrudes from the surface of one side of the flange 806 (e.g., side 812*b* in FIG. 8C), extending substantially perpendicular to the surface of the flange 806. Six terminal pins 804 extend upward from the legs 816 and are secured to the bobbin 802; e.g., by means of a press fit or overmolding. Each of the terminal pins 804 extends perpendicular or substantially perpendicular to the surface of the side of flange 806 opposite the side from which legs 816 protrude. Terminal pins 804 serve as wire termination points for the coils, and can be made of any suitable electrically conductive material (e.g. tin-plated phosphor bronze or other conductive material). While terminal pins 804 are depicted in FIGS. 8A-8C as having a square shape, other shapes for terminal pins 804 (e.g., rectangular, round, etc.) are also within the scope of one or more embodiments. Terminal pins 804 extend in the opposite direction relative to legs 816. That is, whereas legs 816 protrude from the surface of side 812*b* of flange 806, terminal pins 804 extend protrude from the opposite surface of side 812*a* of flange 806.

Three standoffs 810 also protrude upward from locations at or near the outer perimeter of flange 806. In the example depicted in FIGS. 8A-8C, standoffs 810 extend in the opposite direction relative to legs 816 (e.g., from the surface of side 812*a* of the flange 806), perpendicular or substantially perpendicular to the surface of the flange 806. Standoffs 810 serve to steady the bobbin 802 and prevent the bobbin from rocking while attached to a printed circuit board (PCB).

Figure 9B:
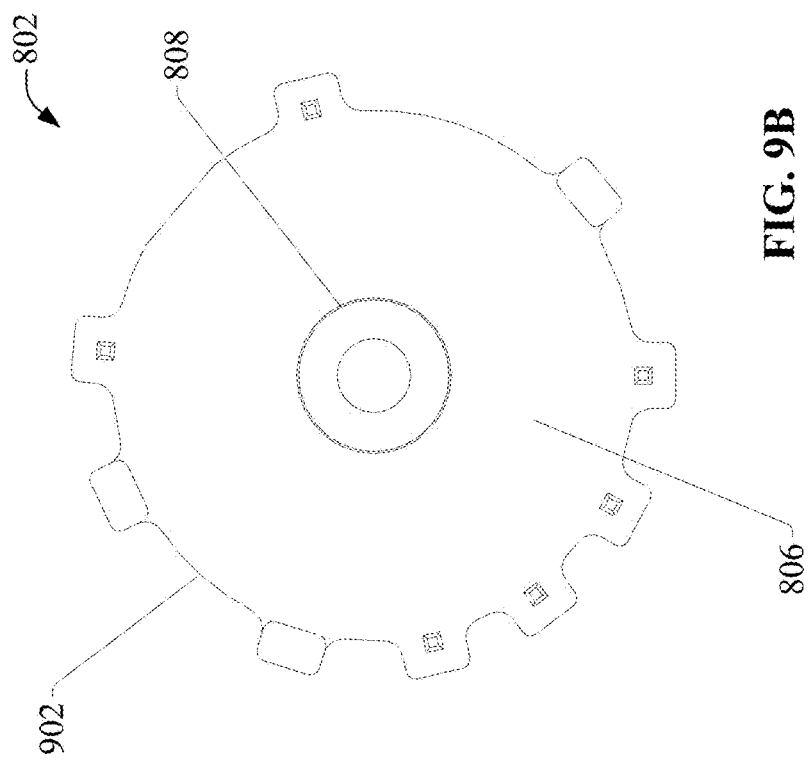
FIG. 9B is a top view of a bobbin indicating the location of the parting line created by an injection molding process.
Figure 9A:
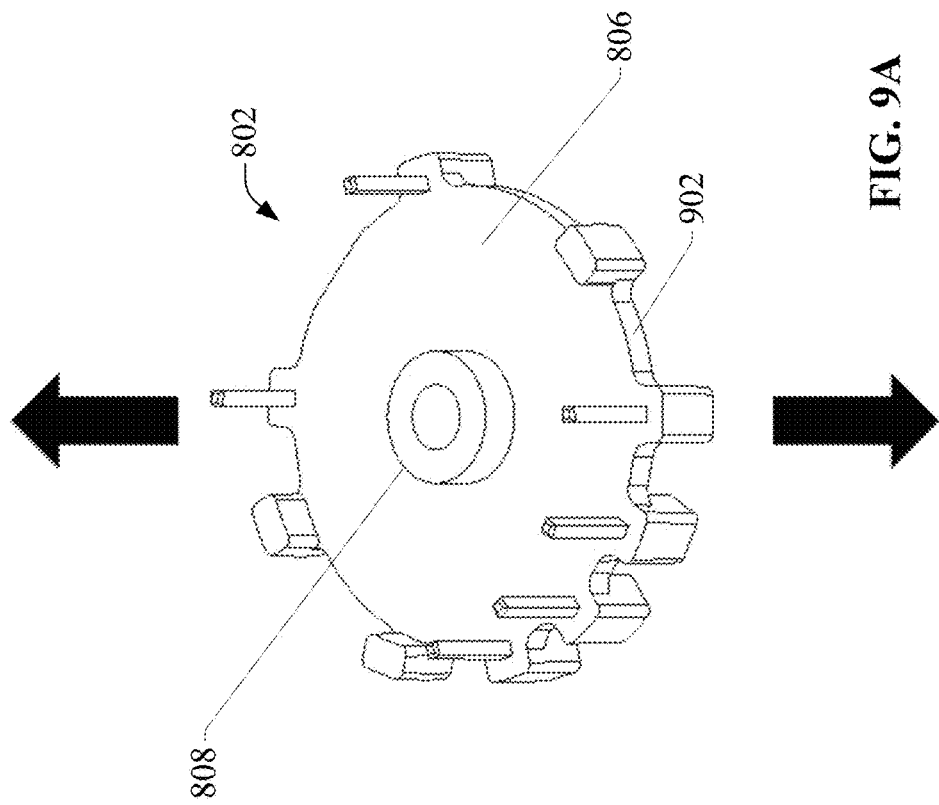
FIG. 9A is a three-dimensional view of a bobbin illustrating the direction in which the two halves of an injection mold separate after the bobbin is injection molded.

In some embodiments, bobbin 802 can be manufactured using an injection molding process. FIG. 9A is a three-dimensional view of bobbin 802 illustrating the direction in which the two halves of the injection mold separate after the bobbin 802 is injection molded, and FIG. 9B is a top view of bobbin 802 indicating the location of the parting line 902 created by the injection molding process. The arrows in FIG. 9A illustrate the direction in which the two halves of the injection mold are pulled after the bobbin 802 is injection molded. The design of bobbin 802 allows for the tool to be separated without the need to draft the flange 806 and without producing parting lines, flash, or parting line mismatch on the side surfaces of the flange 806 or on the center hub 808 where the coil assemblies will be located. Thus, the manufacturing process for bobbin 802 places the flash or parting line 902 on the edge of the flange 806, where the flash or parting line will not cause irregularities in the coil windings. Although the center hub 808 may need to be drafted in the pull direction, the draft on the center hub 808 does not contribute to any irregularities in the coil windings since the coils are wound separately (not on the bobbin 802). Referring to FIG. 9B, because the parting line 902 follows the external perimeter of the bobbin 802, any flash that may occur will likewise be located along the perimeter of the bobbin 802 and not on the face of the flanges 806 where the coil assemblies will be located.

FIG. 10A is a cross-sectional side view of bobbin 802 depicting coils $1002a$, $1002b$, $1002c$, and $1002d$ mounted to the bobbin according to an example coil architecture. FIG. 10B is a top view of bobbin 802 illustrating the direction of the coil windings on the bobbin. Although FIG. 10A depicts an example coil architecture that includes two coil assemblies $1006a$ and $1006b$ mounted on respective sides of flange 806, with each coil assembly comprising a receiver coil ($1002b$ and $1002c$) wound on top of a transmitter coil ($1002a$ and $1002d$), it is to be appreciated that the bobbin 802 described herein is not limited to supporting such coil architectures. Rather, any suitable coil architecture can be supported by bobbin 802 (e.g., a single transmitter coil and a single receiver coil on respective sides of the flange 806, or other suitable architectures). As will be described in more detail below, the coil assemblies can be wound separately and without the aid of the bobbin 802, and subsequently mounted to the bobbin. Alternatively, the coil assemblies can be wound directly on the bobbin 802 if preferred.

In the illustrated example, coils $1002a$ and $1002b$ make up a first coil assembly $1006a$ mounted to a first (back) side of flange 806, and coils $1002c$ and $1002d$ make up a second coil assembly $1006b$ mounted to a second (front) side of flange 806. Thus, each coil assembly $1006a$ and $1006b$ consists of two coils, a transmitter coil (coils $1002a$ and $1002d$ for the back and front sides, respectively) and a receiver coil (coils $1002b$ and $1002c$ for the back and front sides, respectively). Transmitter coils $1002a$ and $1002d$ (labeled Tb and Tf) are attached to bobbin 802 such that the inner circumferences of the transmitter coils $1002a$ and $1002d$ are adjacent to the center hub 808 (that is, the hub 808 passes through the center holes of the transmitter coils $1002a$ and $1002d$), while receiver coils $1002b$ and $1002c$ (labeled Rb and Rf) are attached to bobbin 802 such that the inner circumferences of the receiver coils $1002b$ and $1002c$ are adjacent to the outer circumferences of the transmitter coils $1002a$ and $1002d$. To ensure that the receiver coils $1002b$ and $1002c$ are able to fit around the transmitter coils $1002a$ and $1002d$ in this manner, the inner diameters of the receiver coils $1002b$ and $1002c$ are equal to or larger than the outer diameters of the transmitter coils $1002a$ and $1002d$. In this way, back receiver coil $1002b$ and back transmitter coil $1002a$ are mounted concentrically about hub 808 on a first side of flange 806, while front receiver coil $1002c$ and front transmitter coil $1002d$ are mounted concentrically about hub 808 on a second side of flange 806 opposite the first side. One side of each of the coil assemblies $1006a$ and $1006b$ abuts against a side of flange 806.

Coils 1002 can be fabricated from any suitable conductive material (e.g., 0.07 millimeter diameter bondable copper wire). Using bondable wire (wire coated with a heat activated adhesive) instead of magnet wire or litz wire can help to maintain a uniform coil winding and packing density since each wire turn is bonded to the prior wire turn by applying heat during the coil winding process. As a result, the bonded wire coils are less free to move or shift once wound. Uniformity of the coil winding has a direct effect on mutual inductance (a key performance parameter). Consequently, maintaining a uniform coil winding helps to ensure good sensor performance. The use of bondable wire also allows the coil assemblies $1006a$ and $1006b$ to be wound separately prior to installation on the bobbin 802, since the bobbin 802 is not required to hold the coil wires in place during winding.

The front coil assembly $1006b$ is made up of a front transmitter coil (Tf) $1002d$ and front receiver coil (Rf) $1002c$. In this example, the front transmitter coil (Tf) $1002d$ has an inner diameter (or hole diameter) slightly greater than the outer diameter of the center hub 808, and an outer diameter determined by the number of bonded wire turns. The front receiver coil (Rf) $1002c$ is wound around the outer diameter of the front transmitter coil (Tf) $1002d$ such that the outer diameter of the front transmitter coil (Tf) $1002d$ serves as the inner diameter of the front receiver coil (Rf) $1002c$, and the outer diameter of the front receiver coil (Rf) $1002c$ is determined by the number of bonded wire turns. In this way, one coil is wound on top of the other on each side of flange 806. Specifically, the front receiver coil $1002c$ is wound on top of the front transmitter coil $1002d$ in this example architecture.

The back coil assembly $1006a$ is made up of back transmitter coil (Tb) $1002a$ and back receiver coil (Rb) $1002b$ wherein the back transmitter coil (Tb) $1002a$ has an inner diameter slightly greater than the outer diameter of the center hub 808 and an outer diameter according to the number of bonded wire turns. The back receiver coil (Rb) $1002b$ is wound around the outer diameter of the back transmitter coil (Tb) $1002a$ such that the outer diameter of the back transmitter coil (Tb) $1002a$ serves as the inner diameter of the back receiver coil (Rb) $1002b$ and the outer diameter of the back receiver coil (Rb) $1002b$ is determined by the number of bonded wire turns, which may be fewer than those of the front receiver coil (Rf) $1002c$. In this way, one coil is wound on top of the other. Specifically, the back receiver coil $1002b$ is wound on top of the back transmitter coil $1002a$ in this example architecture.

Having slightly fewer turns on the back receiver coil (Rb) $1002b$ can create a slight imbalance in the electromagnetic field between the front coil assembly $1006b$ (coils $1002c$ and $1002d$) and the back coil assembly $1006a$ (coils $1002a$ and $1002b$). Having fewer turns on the back receiver coil (Rb) $1002b$ can create better rejection to surrounding metal effects. In this regard, a stainless steel sensor housing with a stainless steel sensing face can create unique challenges with regard to surrounding metal effects. On one hand, a sensing frequency must be chosen such that attenuation through the sensing face is not significant. On the other hand, a stainless steel housing may not provide sufficient isolation from surrounding metal effects. Given these challenges, a suitable coil design seeks to achieve the smallest negative impact on sensing distance from either ferrous or non-ferrous surrounding metals. The inductance ratio between the front receiver coil (Rf) 1002c and back receiver coil (Rb) 1002b can be controlled to achieve substantially optimal performance.

In an example coil architecture, front transmitter coil (Tf) 1002d, back transmitter coil (Tb) 1002a, front receiver coil (Rf) 1002c, and back receiver coil (Rb) 1002b can comprise four distinct coils. In another example coil architecture, the front transmitter coil (Tf) 1002d on the front coil assembly 1006b can be electrically connected in series to the back transmitter coil (Tb) 1002a on the back coil assembly 1006a, while the front receiver coil (Rf) 1002c and the back receiver coil (Rb) 1002b remain separate coils. In this way, the two transmitter coils 1002a and 1002d function as one transmitter coil (Tx) surrounded by two different receiver coils 1002b and 1002c. This coil architecture can be achieved by dividing the turns or coils of a single transmitter coil substantially equally between the two coil assemblies 1006a and 1006b on the respective two sides of flange 806. This yields a symmetrical and balanced winding architecture that consumes less space relative to architectures that segregate all coils into separate bobbin slots.

The coil assembly heights are less than the height of the center hub 808 relative to the surfaces of flange 806. That is, the back coil assembly 1006a has a height that is less than a distance from the surface of flange 806 on which back coil assembly 1006a is mounted and the back end 1008a of center hub 808, while the front coil assembly 1006b has a height that is less than a distance from the surface of flange 806 on which front coil assembly 1006b is mounted and the front end 1008b of center hub 808. This produces a gap 1004 through which the coil wire leads can pass, avoiding the need for the wire leads to reside between the coil assemblies and the flange 806, which would otherwise prevent the coil assemblies from sitting flush against the flange 806.

The arrow in FIG. 10B indicates the direction of the coil windings. The coils are wound in a counterclockwise direction in this example, although the coils can also be wound in a clockwise direction. In general, the coils will be wound in the same direction so that the coils do not cancel one another.

When winding one coil over another, it is important to keep the coil lead wires of the inner coil from interfering with the winding of the outer coil. A suitably designed coil winding arbor can solve this issue. FIGS. 11A-11E are cross-sectional side views of an example coil winding arbor 1102 that can be used to wind a coil or coil assembly without the need for a bobbin. The resulting coil or coil assembly can then be affixed to bobbin 802. Coil winding arbor 1102 can be made of metal or another strong material that is sufficiently rigid to ensure that there is no deflection during winding. Coil winding arbor 1102 can comprise a round turret 1104 and an end piece 1116 held together with screw 1118. A round shaft 1120 having a diameter smaller than the turret 1104 protrudes from one end of the turret 1104 such that the end piece 1116 mounts to the end of the shaft 1120, leaving a space between the turret 1104 and end piece 1116 within which coils can be wound. The outer diameter of the shaft 1120 is slightly larger than the outer diameter of the central hub 808 of bobbin 802 to ensure that the coil assembly will fit over the central hub 808 without interference.

Turret 1104 has a chamfer 1108 (or radius) along the edge of one end (the end from which shaft 1120 protrudes) to eliminate sharp edges that could contact and break the coil wires. End piece 1116 also has a chamfer 1130 (or radius) along the edge of the end that faces the turret 1104. The round shaft 1120 has a threaded hole 1106 that extends through the center of the shaft, and which is configured to receive complementary threaded screw 1118. A through-hole 1112 passes through end piece 1116 and allows screw 1118 to pass through, thereby coupling the end piece 1116 to the turret 1104. The shaft 1120 meets the turret 1104 at a sharp corner (i.e., there is no substantial radius at the interface between the turret 1104 and the shaft 1120). Likewise, the end piece 1116 mates to the shaft 1120 at a sharp corner. This can ensure that a sharp corner is present to prevent disruption to the coil windings.

Wire leads guide channels 1110 or grooves are formed on the surface of end piece 1116 (although FIGS. 11A-11E depict guide channels 1110 as being formed in the end piece 1116, in some embodiments the guide channels 1110 can instead be formed in the turret 1104). These guide channels 1110 allow the lead wires 1122 of an inner coil 1124 to be routed away from the winding area during winding, preventing interference with the winding of the outer coil 1126. In this manner, interruption of the bonded wire windings can be avoided, producing a coil with substantially uniform symmetry. The guide channels 1110 cause the coil lead wires to exit on the same side of the coil winding, resulting in a coil or coil assembly having a side that is flat (the side opposite the side from which the coil lead wires exit). The flat side of the resulting coil or coil assembly can be adhesively bonded to the flange 806 of bobbin 802.

Figure 11B:
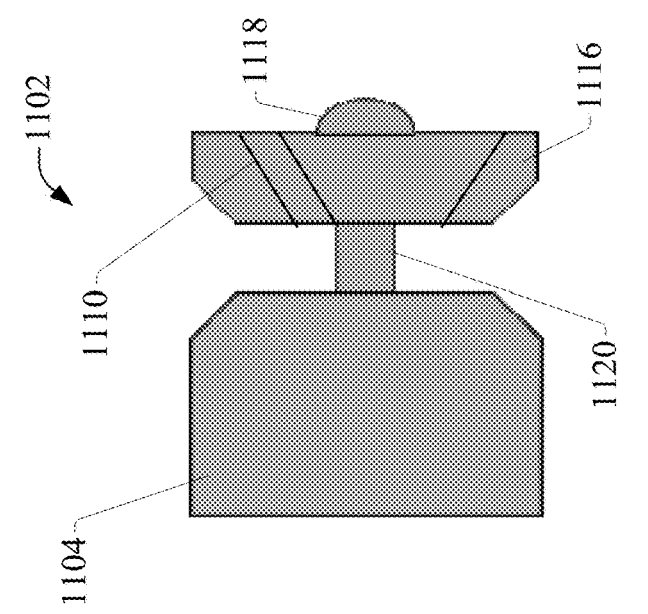
Figure 11A:
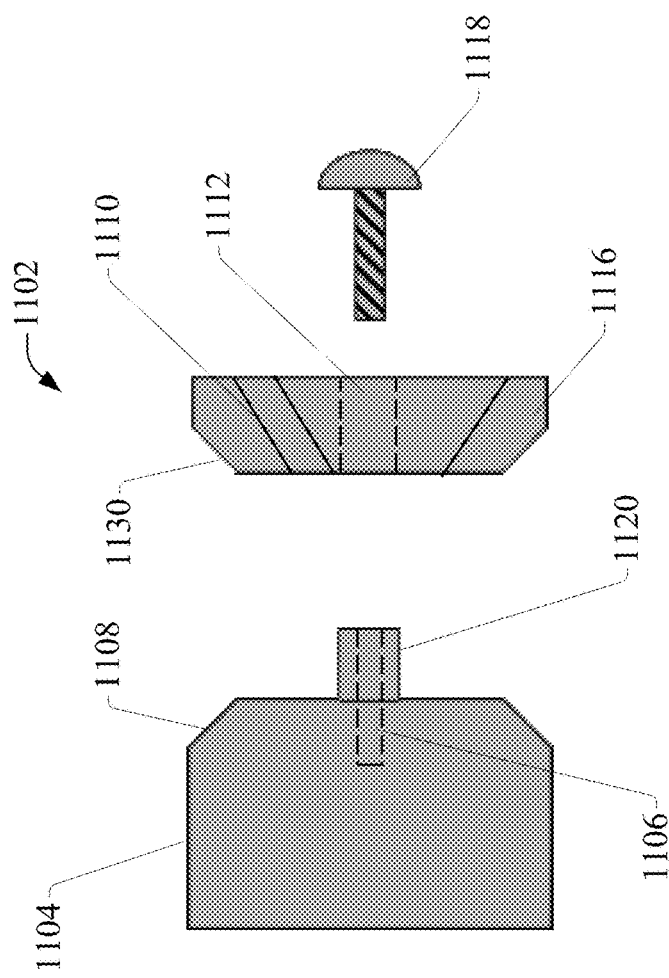
Figure 11D:
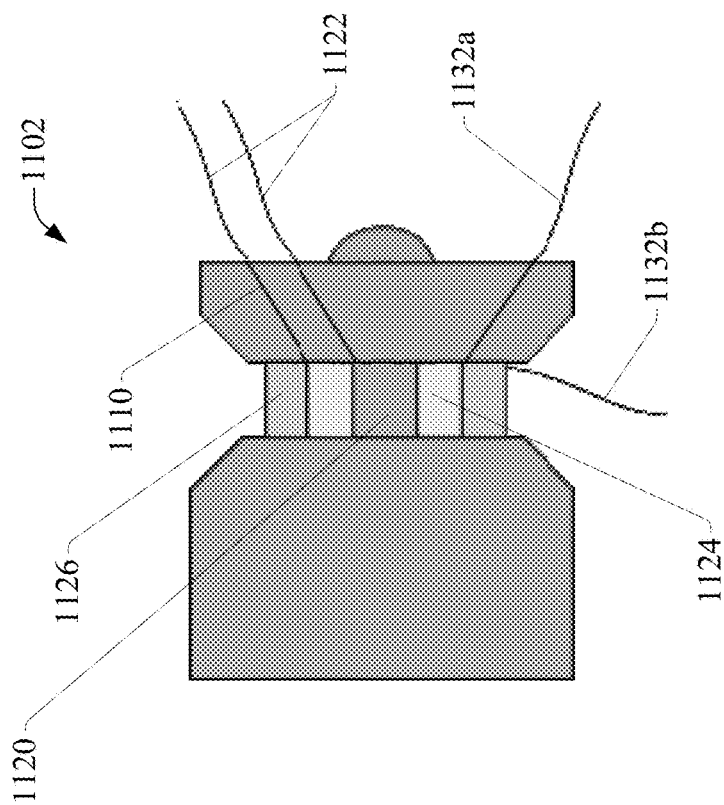
Figure 11C:
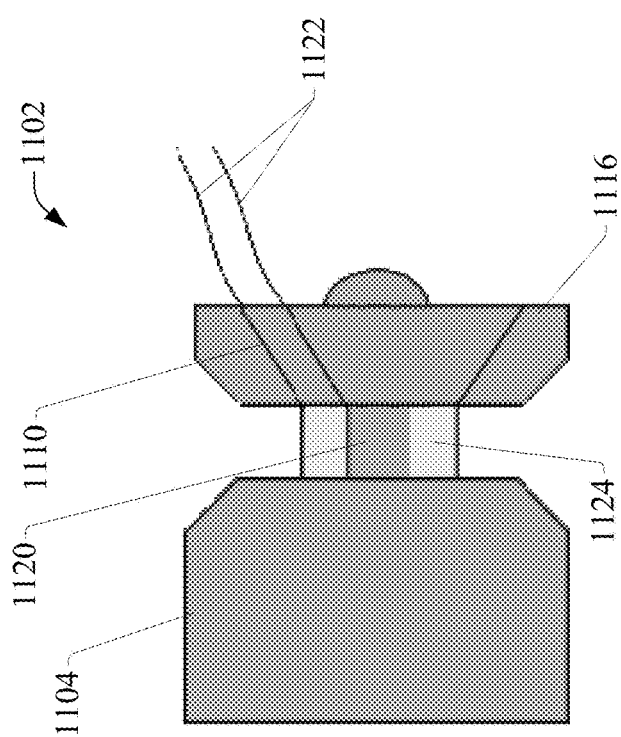

The coil winding process using arbor 1102 is depicted in FIGS. 11C-11E. This example process depicts the winding for a coil assembly comprising an inner coil 1124 and an outer coil 1126, as discussed above in connection with FIG. 10A. As shown in FIG. 11C, the inner coil 1124 is wound on the arbor 1102 using bondable wire. Specifically, the inner coil 1124 is wound around shaft 1120 between turret 1104 and end piece 1116. The coil lead wires 1122 pass through two of the guide channels 1110 in the end piece 1116, guiding the lead wires 1122 away from the inner coil 1124 during winding and preventing the lead wires 1122 from disrupting the winding of the first coil 1124.

Next, as shown in FIG. 11D, the outer coil 1126 is wound over the outer diameter of the inner coil 1124 using bondable wire. A first lead wire 1132a of outer coil 1126 is routed through another of the guide channels 1110 to prevent the lead wire 1132a from disrupting the winding process. It is not necessary for the second lead wire 1132b of outer coil 1126 to pass through a guide channel 1110, since the lead wire 1132b is on the outer coil's outer diameter and no other coil will be wound on top of the second coil 1126.

Next, as shown in FIG. 11E, the coil winding arbor 1102 is opened by separating the turret 1104 and end piece 1116, and the completed coil assembly—comprising inner coil 1124 and outer coil 1126—is removed. The use of bondable wire can cause each turn of each coil to adhere to a previous turn so that the coils do not unravel when removed from the arbor 1102. The guide channels 1110 are configured to direct the coil lead wires outward from the same side of the coil windings. Thus, the resulting coil assembly has a flat side 1128 opposite the coil leads, since the coil leads all exit on the side opposite the flat side 1128. This flat side 1128 can be adhesively bonded to the flange 806 of bobbin 802. This allows the coil lead wires 1122 and 1132 to pass between gaps that are present between the bobbin and sensor housing and between the bobbin and the PCB. This can ensure that the front and back coil assemblies remain substantially parallel with each other when mounted to the respective sides of flange 806.

Figure 12A:
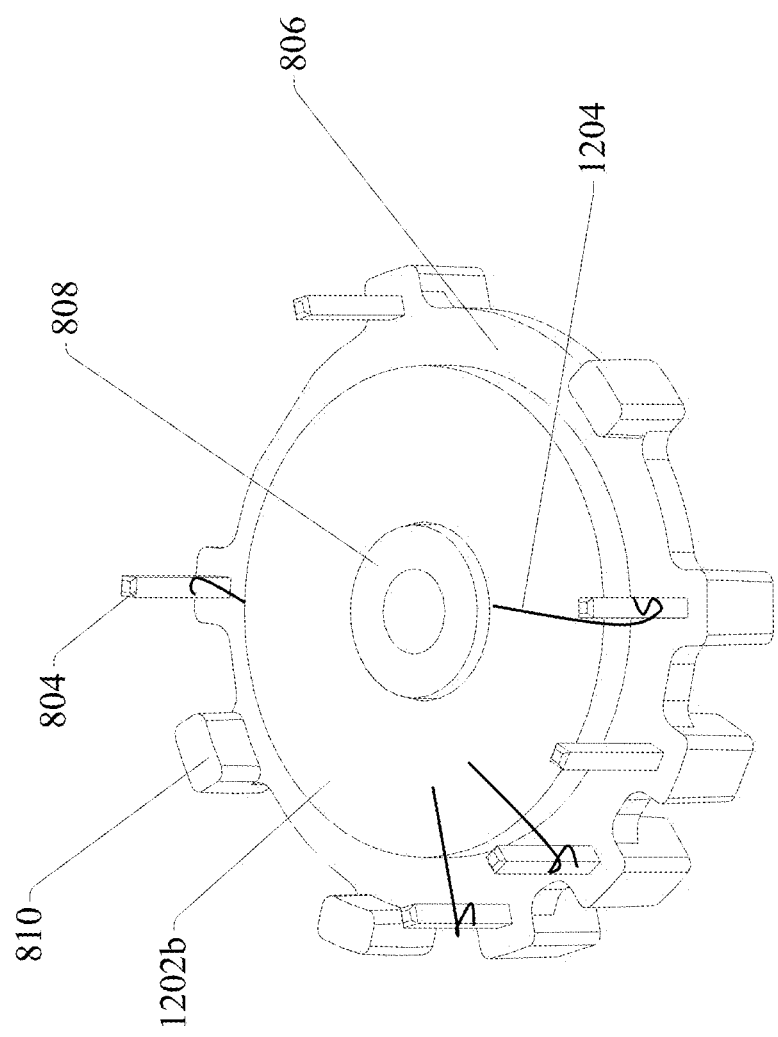
FIG. 12A is a three-dimensional view of an example bobbin with attached coil assemblies.
Figure 12B:
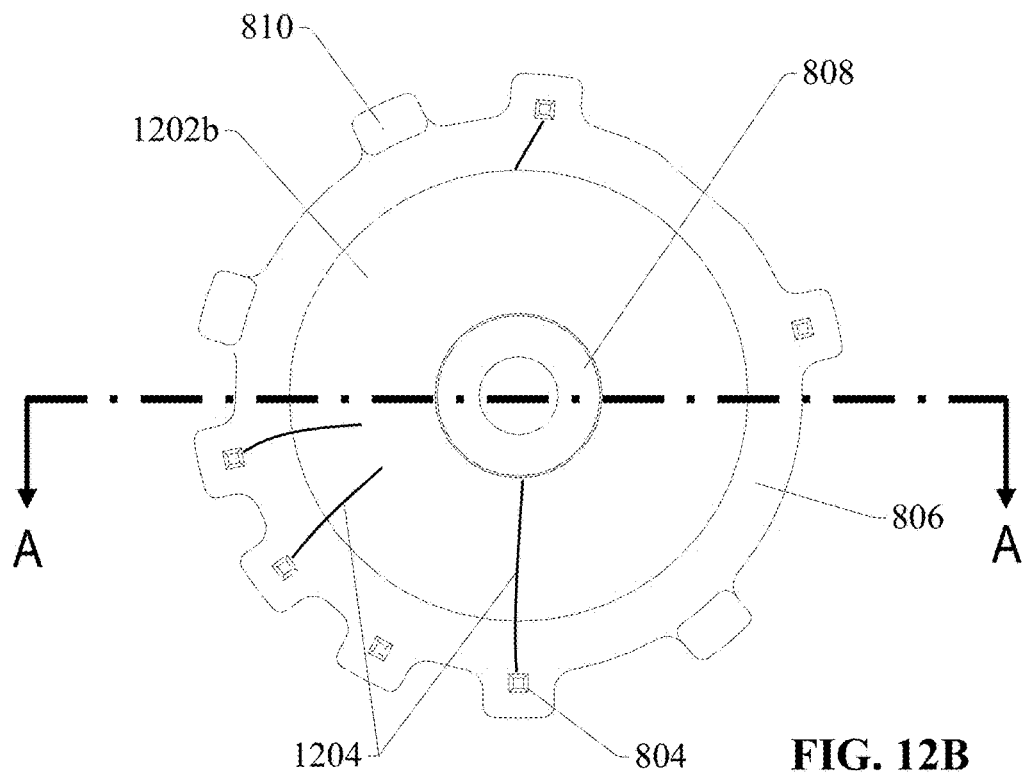
FIG. 12B is a top view of an example bobbin with attached coil assemblies.
Figure 12C:
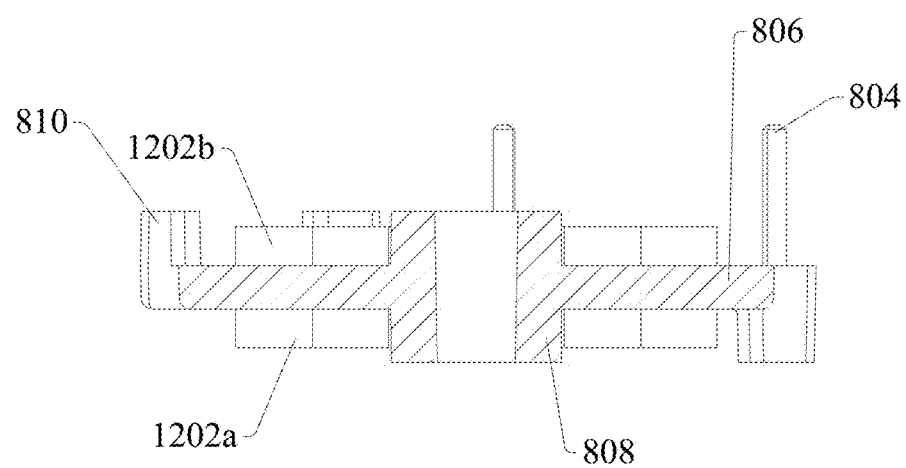
FIG. 12C is a cross-sectional side view of an example bobbin with attached coil assemblies.

The coil assembly resulting from the process described above in connection with FIGS. 11A-11E can be attached to bobbin 802. FIG. 12A is a three-dimensional view of bobbin 802 with coil assemblies 1202a and 1202b attached thereto (only coil assembly 1202b can be seen in FIG. 12A). FIGS. 12B and 12C are a top view and a cross-sectional side view, respectively, of bobbin 802 with the attached coil assemblies 1202a and 1202b. In this example, two coil assemblies—a front coil assembly 1202a and back coil assembly 1202b—are fit over the center hub 808 with the flat sides of the assemblies (the sides opposite the sides from which the coil leads exit the assembly) abutting against flange 806. The coil assemblies 1202a and 1202b can be bonded to the flange 806 using an adhesive, such as an adhesive with a CTE less than or equal to 107 μm/m/° C. (e.g., Loctite 401 or Loctite 420 cyanoacrylate adhesive). Cyanoacrylates are suitable for bonding the coil assemblies because they can produce a thin film between the flange 806 and the coil assemblies 1202a and 1202b. Minimizing the thickness of the adhesive layer can help to keep the coil assemblies parallel to each other as well as to maintain the vertical separation distance between the coil assemblies. The lead wires 1204 are wrapped around the terminal pins 804 and electrically connected thereto (e.g., using solder or another connection mechanism). As in the example architecture described above in connection with FIG. 10A, each coil assembly 1202a and 1202b consists of two coils, each coil having two lead wires 1204. Thus, there are four lead wires 1204 per coil assembly. With two coil assemblies per bobbin, there are a total of eight lead wires 1204 to be terminated to the six terminal pins 804 on the bobbin 802.

Figure 13B:
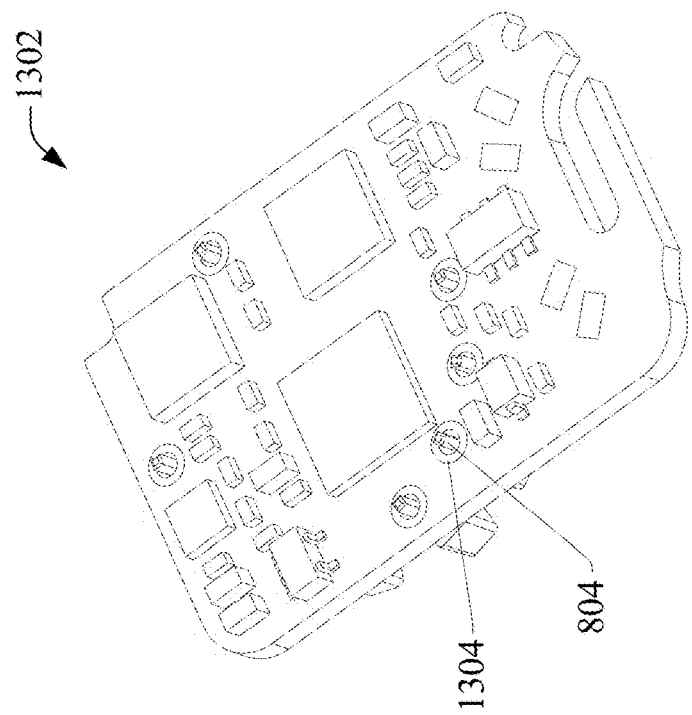
FIG. 13B is a three-dimensional top view of an example printed circuit board (PCB) with a bobbin/coil assembly attached thereto.
Figure 13A:
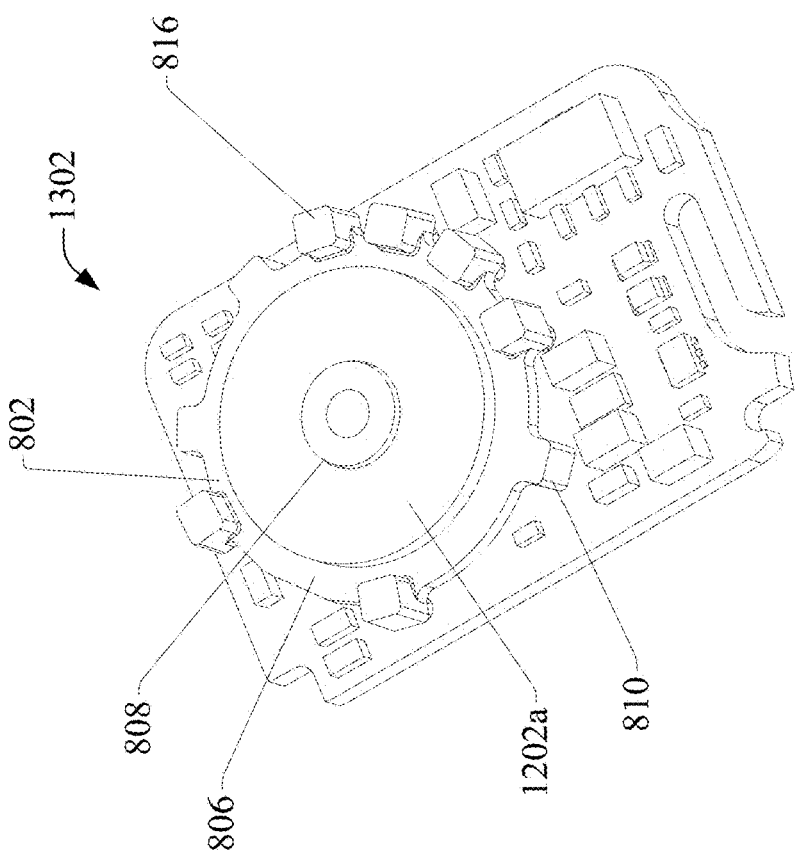
FIG. 13A is a three-dimensional bottom view of an example printed circuit board (PCB) with a bobbin/coil assembly attached thereto.

Bobbin 802 with one or more coils (or coil assemblies) attached thereto can be incorporated as a component of substantially any type of device that utilizes inductive sensing coils, including but not limited to industrial inductive sensors. To this end, bobbin 802 with attached coils can be mounted on a printed circuit board to be installed in such devices. FIGS. 13A and 13B are bottom and top views, respectively, of an example printed circuit board (PCB) 1302 with the bobbin/coil assembly (comprising bobbin 802 and attached coil assemblies 1202a and 1202b) attached thereto. As shown in these figures, the bobbin standoffs 810 and center hub 808 sit flush against the PCB 1302 and maintain sufficient space between the PCB 1302 and flange 806 to allow the coil assembly 1202b facing the PCB 1302 to reside between the flange 806 and the PCB 1302. The terminal pins 804 pass through plated through-holes 1304 in the PCB 1302 and are soldered to the through-holes 1304, thereby electrically connecting the pins 804 (and the coil lead wires attached to the pins 804) to the PCB 1302.

Figure 14B:
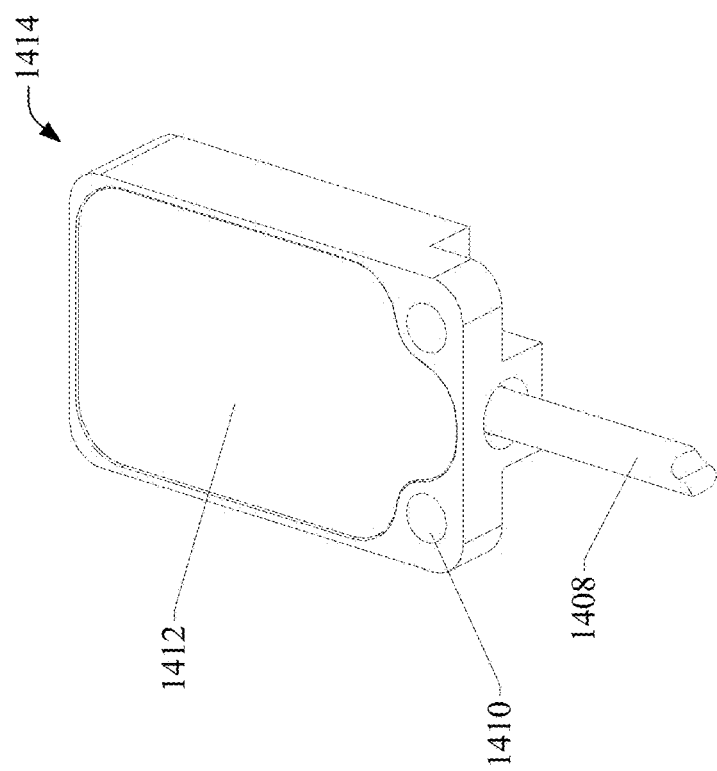
FIG. 14B is a three-dimensional back view of an example inductive proximity sensor that incorporates a bobbin/coil assembly.
Figure 14A:
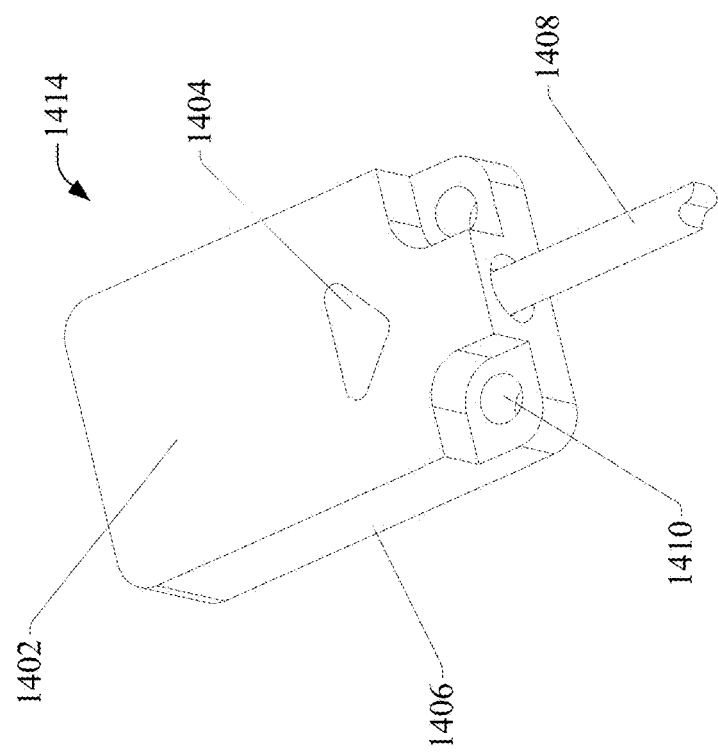
FIG. 14A is a three-dimensional front view of an example inductive proximity sensor that incorporates a bobbin/coil assembly.

FIGS. 14A and 14B are three-dimensional front and back views, respectively, of an example inductive proximity sensor 1414 that incorporates the bobbin/coil assembly described above. In some embodiments, proximity sensor 1414 can be constructed of a stainless steel housing 1406 (e.g., 303 stainless steel). The sensing face 1402, behind which the coil or coil assembly is located, can have a thickness of approximately 0.5 millimeters (0.020 inches). The housing 1406 has a triangular shaped light emitting diode (LED) window 1404 located below the sensing face 1402. Two mounting holes 1410 are located at one end of the housing 1406; e.g., the end from which the sensor cable 1408 exits the housing 1406. The back of the housing (depicted in FIG. 14B) can be covered by a stainless steel cover 1412 (e.g., 430 stainless steel) that also acts as a magnetic shield.

Figure 15:
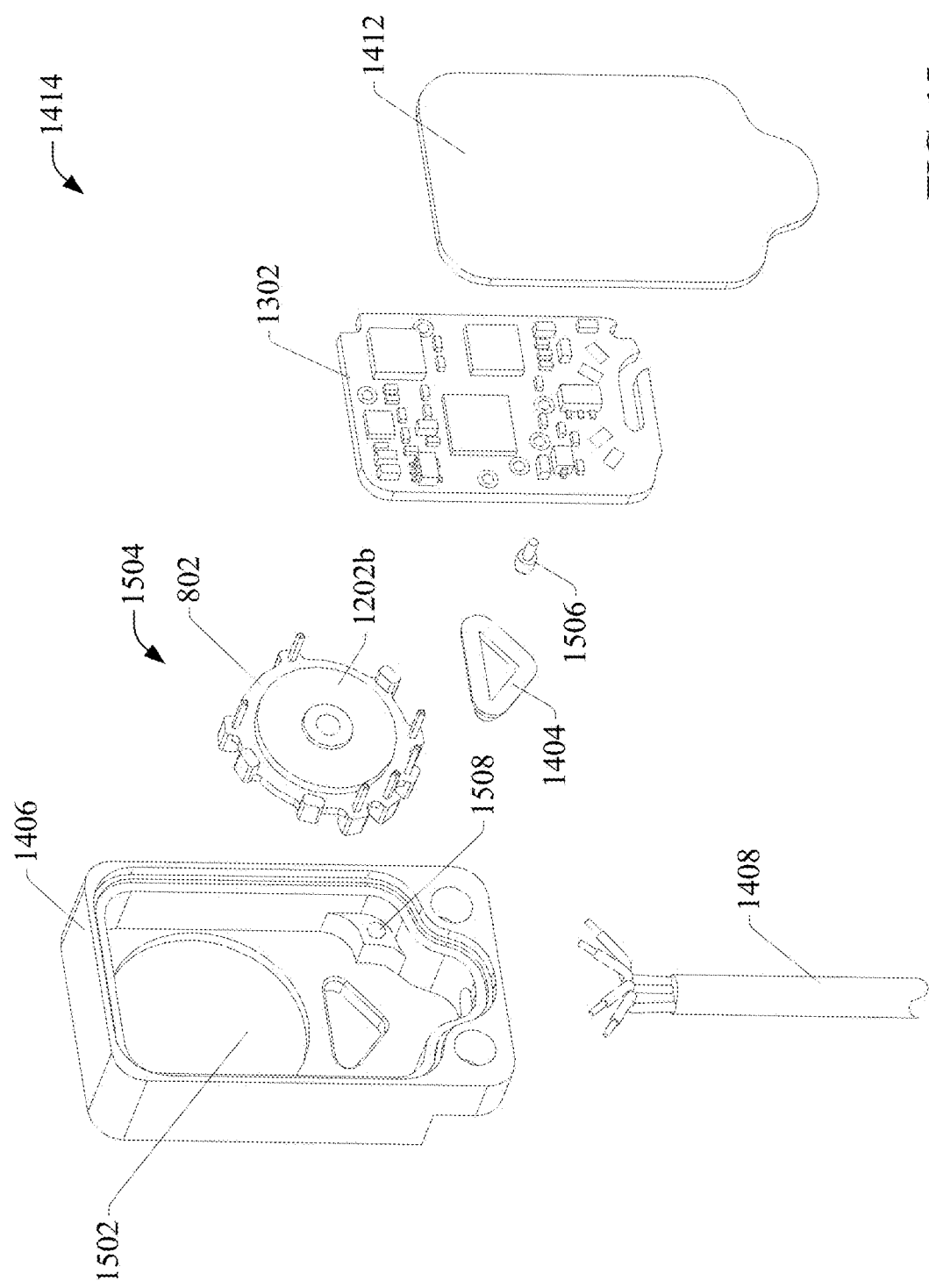
FIG. 15 is an exploded view of an inductive proximity sensor that incorporates a bobbin/coil assembly.

FIG. 15 is an exploded view of the inductive proximity sensor 1414. In an example embodiment, the sensor housing 1406 can have walls that are approximately 1.5 millimeters (0.059 inches) thick. A recessed pocket 1502 in the interior of housing 1406 forms the sensing face 1402. The bobbin/coil assembly 1504 (comprising coil assemblies 1202a and 1202b attached to bobbin 802, as shown in FIGS. 12A-12C) seats within the pocket 1502 formed on the inside front surface of the housing 1406. The LED window 1404 can comprise any suitable transparent or translucent material (e.g., polyurethane). A tin-plated brass ground pin 1506 is press fit into a complementary hole 1508 in the housing 1406. PCB 1302 is soldered or otherwise electrically connected to the coil assembly and ground pin 1506. Cable 1408 can include conductors for communicatively connecting external devices (e.g., industrial controllers) to the sensor 1414. For example, cable 1408 can be electrically connected to the detection circuitry 112 (see FIG. 1) and can convey digital or analog output signals to an external device indicating presence of an object 110 near the sensing face 1402.

Figure 16A:
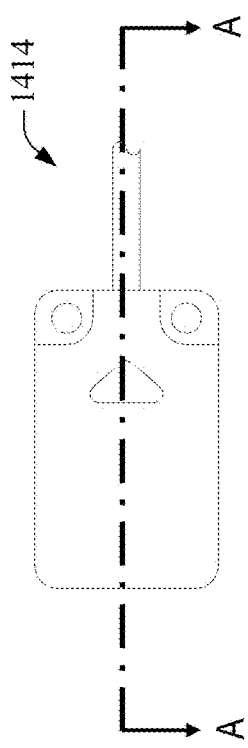
FIG. 16A is a front view of an inductive sensor.
Figure 16B:
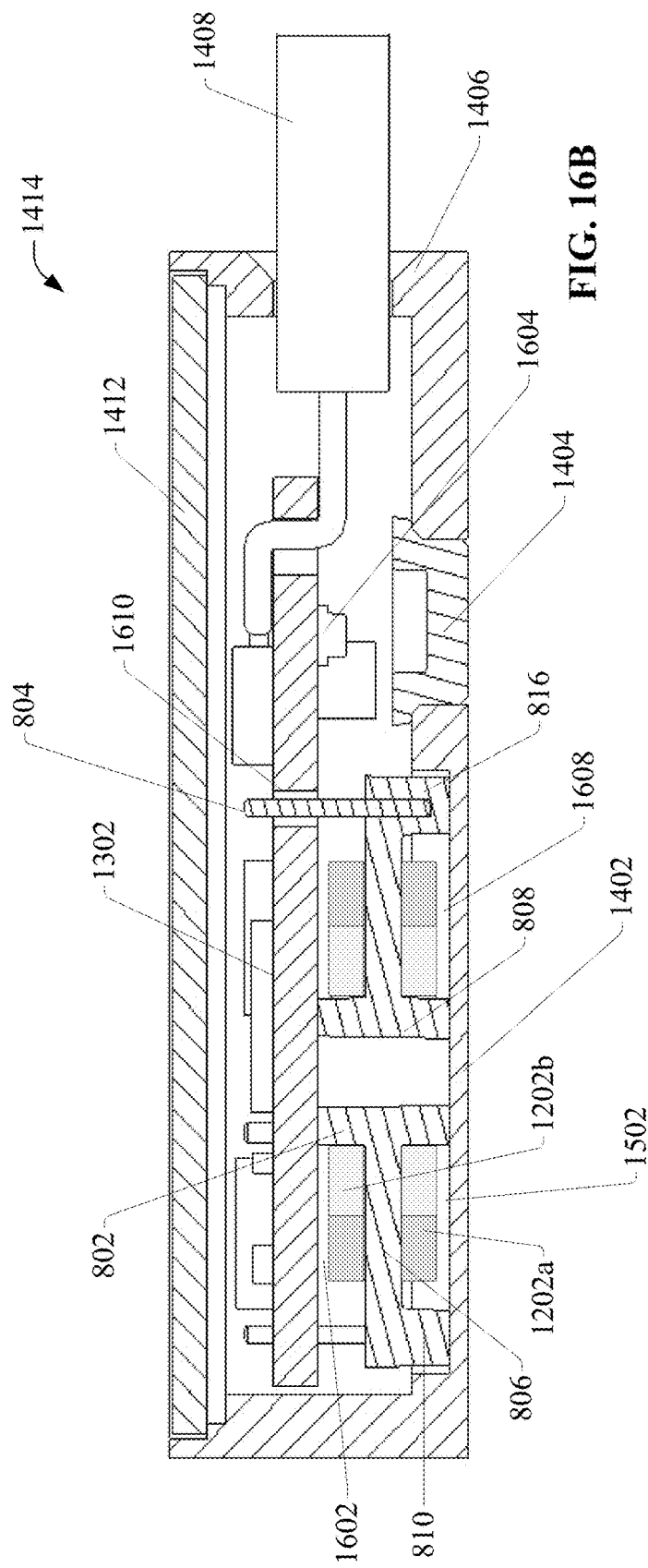
FIG. 16B is a cross-sectional side view of an inductive sensor.

FIG. 16A is a front view of sensor 1414, and FIG. 16B is a cross-sectional side view of sensor 1414 that allows the assembled product to be seen. The bobbin/coil assembly sits in a recessed pocket 1502 formed on the inside front surface of housing 1406 directly behind the sensing face 1402. The two coil assemblies 1202a and 1202b are mounted on bobbin 802. Coil assembly 1202a is mounted to a first side of center flange 806 and coil assembly 1202b is mounted to a second side of center flange 806 opposite the first side. In this example, each coil assembly 1202a and 1202b comprises two concentric coils (an inner transmitter coil and an outer receiver coil), as described above in connection with FIG. 10A.

Standoffs 810, center hub 808, and legs 816 abut against the bottom surface of the PCB 1302 and the inside front surface (the base of pocket 1520) of housing 1406 behind sensing face 1402, creating a first space between the first side of flange 806 and the inside front surface of housing 1406 behind the sensing face 1402, and a second space between the second side of flange 806 and the PCB 1302. These spaces provide clearance within which coil assemblies 1202a and 1202b reside. In the illustrated example, a gap 1608 (e.g., a gap of approximately 0.25 millimeters) exists between coil assembly 1202a and the inside front surface of the housing 1406, providing clearance that prevents coil assembly 1202a from making direct contact with the housing 1406, which could cause an electrical short. This gap 1608 also provides a path for the coil lead wires to pass through so that the lead wires can be terminated on the terminal pins 804. Likewise, another gap 1602 exists between coil assembly 1202b and the PCB 1302. Only the bobbin 802 makes contact with the housing 1406 and PCB 1302.

Terminal pins 804 are partially embedded in the bobbin 802 and pass through through-holes 1610 in the printed circuit board. When the unit is potted with epoxy, the epoxy will flow into gaps 1602 and 1608 and surround the coil assemblies 1202a and 1202b, fully immersing and encapsulating the coil assemblies in a rigid potting material. The potting material provides a barrier against moisture penetration (e.g., moisture due to humidity), dielectric strength protection from high voltage such as those resulting from electrostatic discharge events, and a uniform/low expansion over temperature. In some embodiments, the epoxy potting can have a CTE of approximately 40 μm/m/° C. Due to the coils' close proximity to the PCB 1302, the PCB 1302 is constructed such that there is no copper ground plane built into the PCB 1302 directly behind the coils of coil assembly 1202b. Typically, when such a copper ground plane is located directly behind the coil, the electromagnetic field generated by the coil assembly can induce eddy currents in the copper ground plane that cause the plane to behave like a target object, negatively affecting the sensor's temperature performance. Eliminating the copper ground plane can mitigate these effects and improve performance.

Sensor 1414 also includes an LED 1604 mounted to PCB 1302 directly behind LED window 1404. LED 1604 can be configured to provide any suitable visual signaling to a user, including but not limited to a part presence indication.

Figure 17:
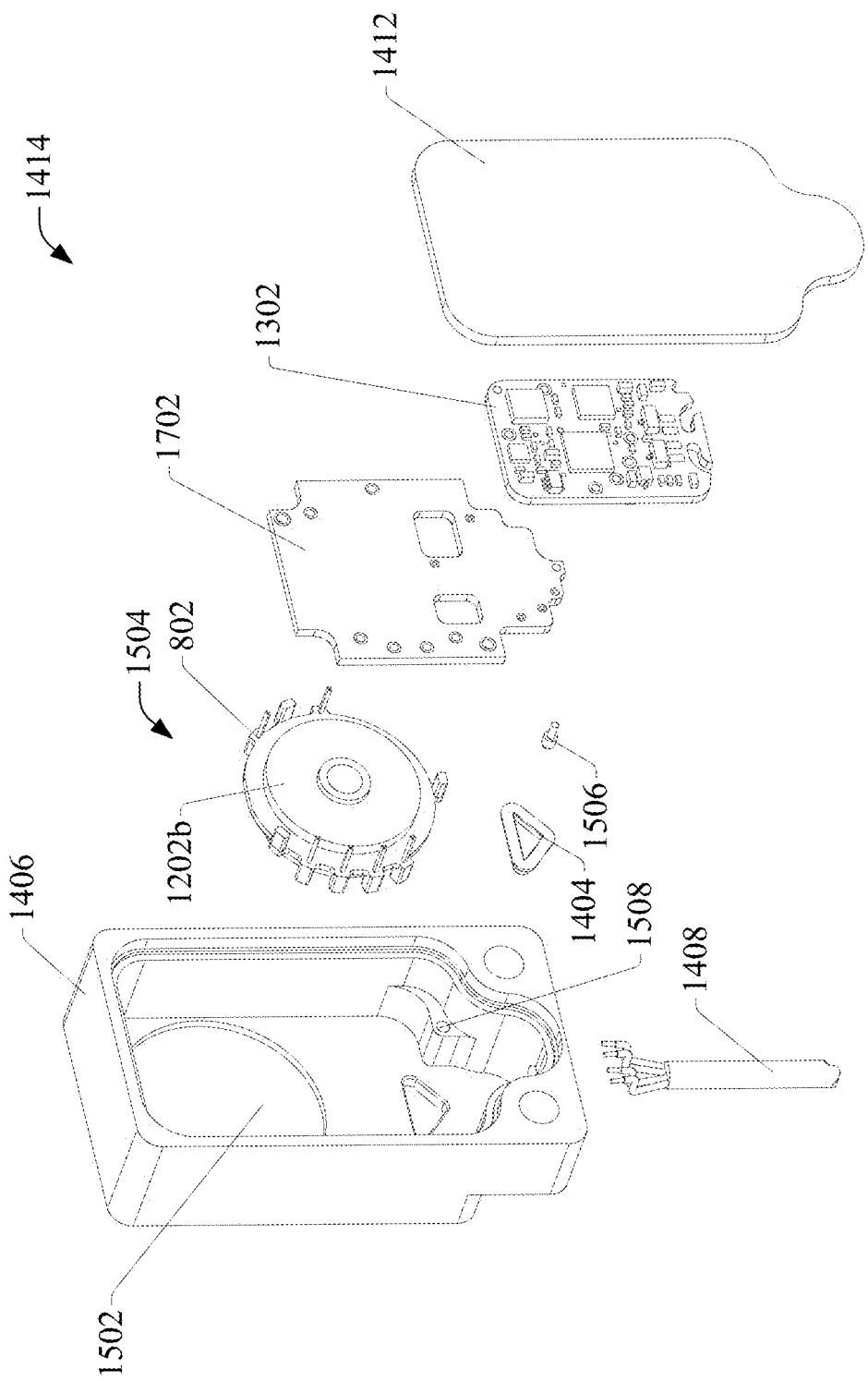
FIG. 17 is an exploded view of another assembly for an inductive sensor.
Figure 18B:
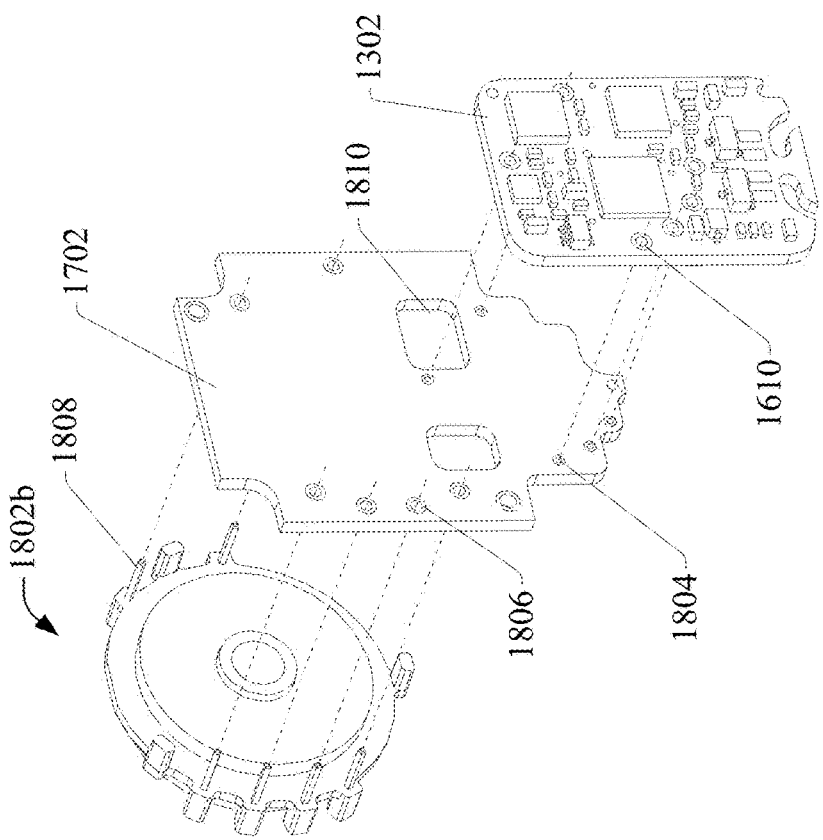
FIG. 18B is an exploded view showing a second bobbin/coil assembly having a second size larger than the first size being connected to a mother PCB via a daughter PCB.
Figure 18A:
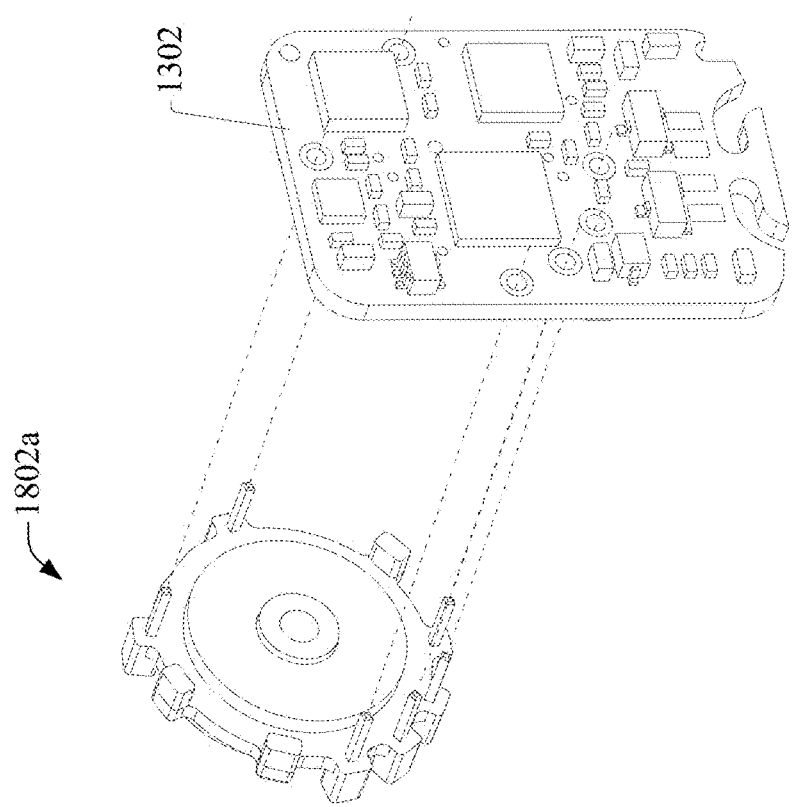
FIG. 18A is an exploded view of an assembly comprising a first bobbin/coil assembly having a first size being connected to a mother PCB.

FIG. 17 is an exploded view of an alternative assembly for sensor 1414. In this example, rather than being directly mounted to PCB 1302, the bobbin/coil assembly 1504 is attached to a stacked PCB assembly comprising PCB 1302—acting as a mother PCB—and a daughter PCB 1702. Plated through-holes on both the mother PCB 1302 and the daughter PCB 1702 overlap when the two PCBs are aligned, allowing terminal pins 804 of the bobbin 802 to pass through the overlapping through-holes of both PCBs. As illustrated in FIGS. 18A and 18B, using a daughter PCB 1702 can allow two different sized bobbin/coil assemblies 1504 to be coupled to the mother PCB 1302 without the need for two different PCB layouts. FIG. 18A is an exploded view showing a first bobbin/coil assembly 1802a having a first size being connected to mother PCB 1302. FIG. 18B is an exploded view showing a second bobbin/coil assembly 1802b having a second size larger than the first size being connected to daughter PCB 1702, which itself is connected to mother PCB 1302. The daughter PCB 1702 has formed therein a first set of through-holes 1804 having a same pattern as the through-holes 1610 in mother PCB 1302 that would otherwise be used to receive the terminal pins of the smaller bobbin/coil assembly 1802a. A second set of plated through-holes 1806 are also formed in daughter PCB 1702 for receiving the terminal pins 1808 of the larger bobbin/coil assembly 1802b. Daughter PCB 1702 can include electrical traces that connect each of the plated through-holes 1806 to its appropriate connection point of mother PCB 1302 (via through-holes 1804).

Figure 18D:
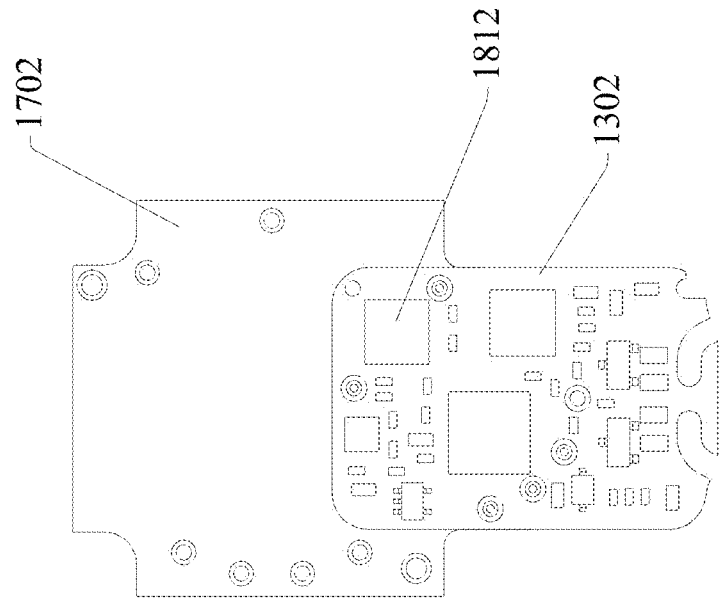
FIG. 18D is a top view of an example mother PCB attached to a daughter PCB.
Figure 18C:
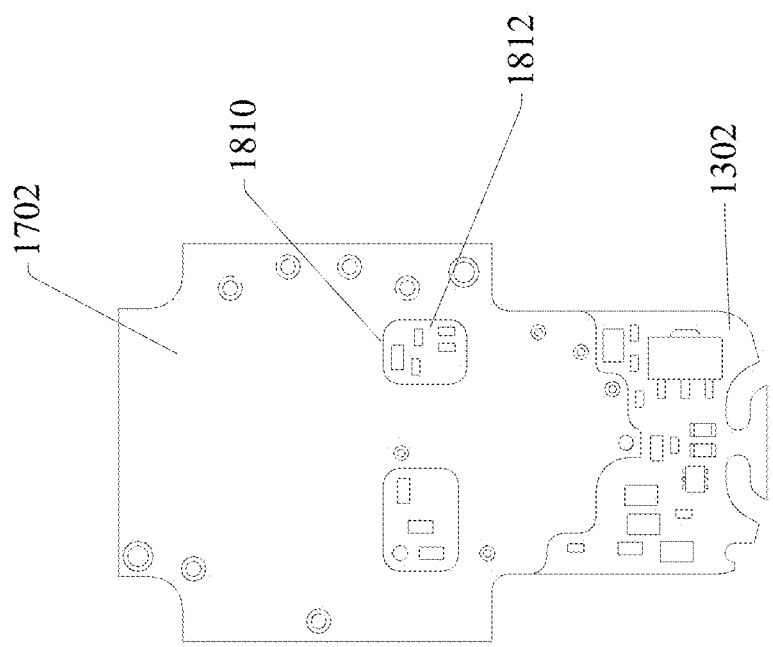
FIG. 18C is a bottom view of an example mother PCB attached to a daughter PCB.

Cutouts 1810 can be formed in the daughter PCB 1702 to accommodate components of the mother PCB 1302. FIGS. 18C and 18D are a bottom view and a top view, respectively, of the mother PCB 1302 attached to the daughter PCB 1702. As can be seen in these views, the cutouts 1810 formed in the daughter PCB 1702 can receive and accommodate circuit board components 1812 mounted on the mother PCB 1302 when the mother PCB 1302 is attached to the daughter PCB 1702.

Using a daughter PCB in this manner allows the same mother PCB 1302 to be connected to any of several different sized bobbin/coil assemblies. This standardization of a single mother PCB can reduce the overall product cost, since the same mother PCB design can be used across multiple different products.

Traditionally, interconnections between daughter PCBs and mother PCBs are achieved through the use of additional connection components, including pins, headers, board-to-board connectors, edge connectors, etc. Pins often require fixturing in order to center the pins in the plated through-holes, and a secondary operation is often required to trim the pins after soldering. Headers and board-to-board connectors can increase the overall distance between the daughter PCB and mother PCB, making such components unfit for applications in which space is limited. Edge connectors can be expensive, and the bulky nature of edge connectors can also render these connectors unsuitable for space-limited applications.

Figure 19B:
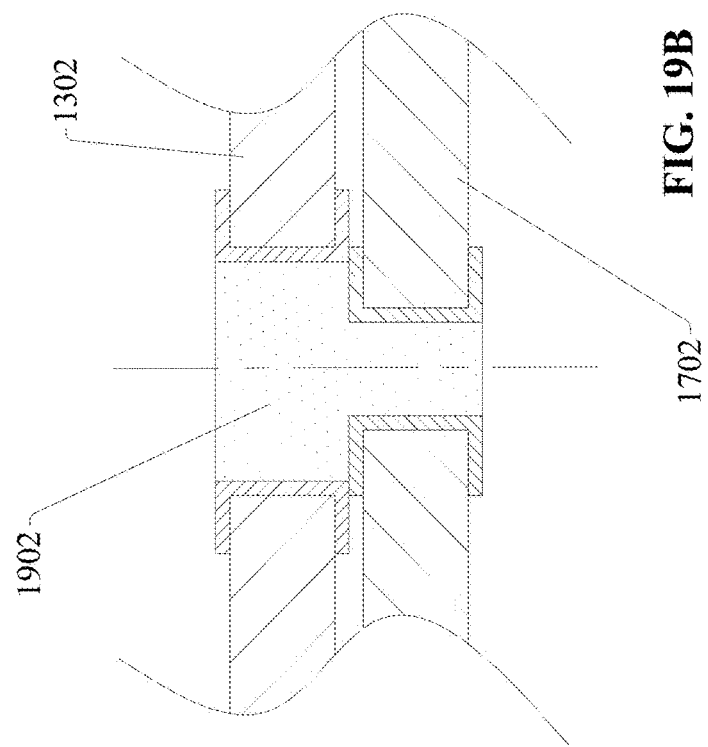
FIG. 19B is a cross-sectional side view depicting overlapping plated through-holes of two PCBs filled with solder.
Figure 19A:
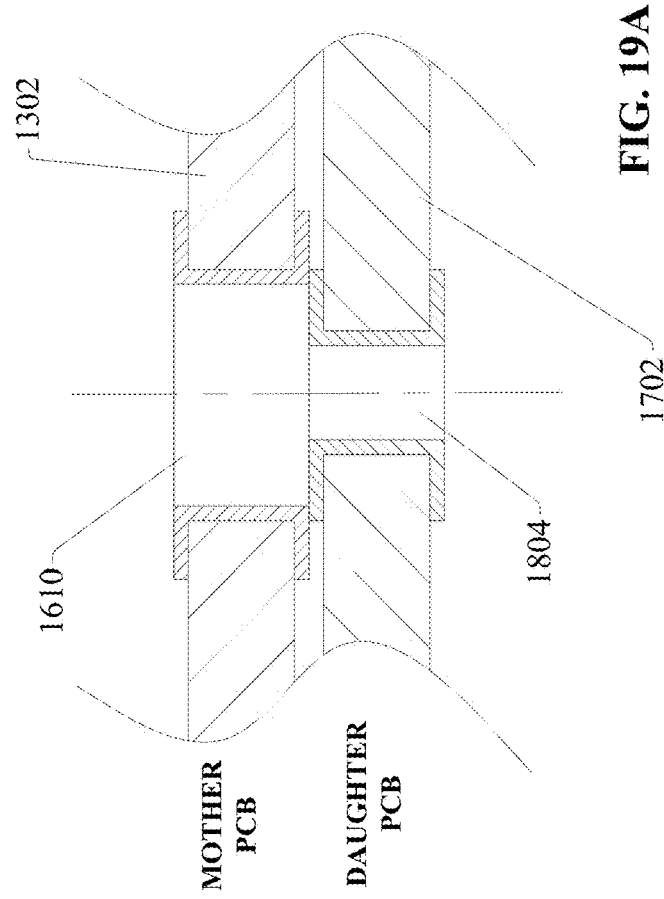
FIG. 19A is a cross-sectional side view depicting overlapping plated through-holes of two PCBs.

To address these issues, the through-holes 1804 of daughter PCB 1702 can be formed to be smaller than the corresponding through-holes 1610 of mother PCB 1302, and solder connections can be formed via these overlapping plated holes. FIGS. 19A and 19B are cross-sectional views depicting overlapping plated through-holes 1610 and 1804. Through-holes 1610 and 1804 of the mother PCB 1302 and daughter PCB 1702, respectively, comprise plated through-holes, where through-hole 1610 of the mother PCB 1302 is larger than through-hole 1804 of the daughter PCB 1702. While through-hole 1610 is depicted as being the larger hole in this example, through-hole 1804 of daughter PCB 1702 can be the larger of the two in some implementations. In general, the hole on the side from which the solder will be received will be the larger of the two overlapping holes. In this example, through-hole 1610 has a diameter that is approximately twice that of through-hole 1804. In some embodiments, the plated through-holes in the mother PCB 1302 and daughter PCB 1702 may be formed with an Electroless Nickel Immersion Gold (ENIG) or Hot Air Solder Leveling (HASL) finish.

FIG. 19B is a cross-sectional view showing the overlapping through-holes after being filled with solder 1902. Solder 1902 is injected into the overlapping through-holes via the larger through-hole 1610 until the solder is flush, or substantially flush, with the surface of the mother PCB 1302. The smaller through-hole 1804 partially restricts the flow of the solder 1902, limiting the amount of excessive solder that flows through to the underside of daughter PCB 1702. The overlapping plated through-holes allow the tapered tip of the soldering iron (e.g. manual or robotic) to make contact with both through-holes to heat the through-holes uniformly, which improves the ease of injecting the solder into the through-holes while inhibiting the formation of undesirable voids, incomplete fill, and cold solder joints. Once the overlapping through-holes are filled, the solder 1902 acts as a pin, but with a smaller profile than a conventional pin. This connection technique is achieved without the need for additional parts or secondary operations (e g, trimming pins after soldering). In addition to providing a means of mechanically attaching the two PCBs, the solder 1902 also forms an electrical connection between the two PCBs.

The technique for connecting a daughter PCB to a mother PCB described above in connection with FIGS. 19A and 19B yields a connection that is strong and resistant to both flexure and shear failures as well as shock and vibration, and can be implemented at a lower cost relative to connection techniques that require additional parts and secondary operations. Since the profile of the connection remains small relative to other techniques requiring additional parts, this technique is well-suited for use in applications with limited available internal space. This technique can also produce a proper bonding between the overlapping holes even if the holes are not perfectly aligned with one another.

Figure 19D:
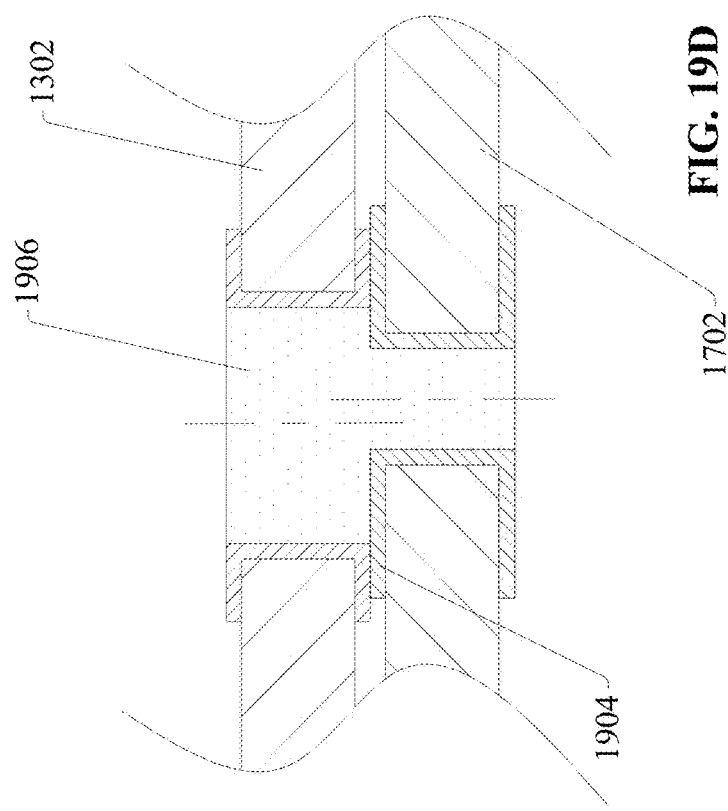
FIG. 19D is a cross-sectional side view depicting overlapping plated through-holes of two PCBs that are slightly misaligned and filled with solder.
Figure 19C:
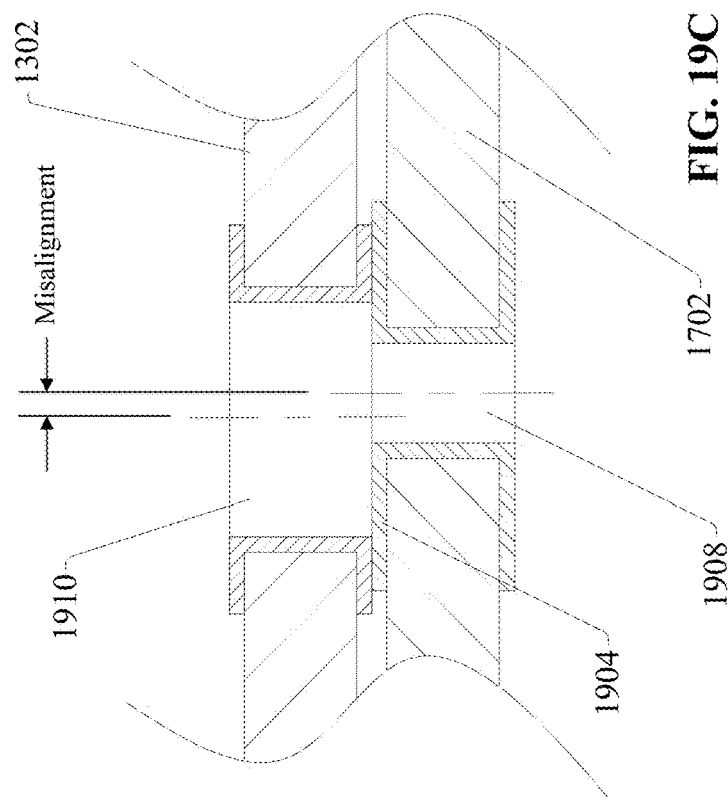
FIG. 19C is a cross-sectional side view depicting overlapping plated through-holes of two PCBs that are slightly misaligned.

Misalignment tolerance can be further increased without adversely affecting the mechanical strength of the solder-filled through-holes by increasing the outer diameter of the plated through-hole annular ring associated with the smaller plated through-hole. FIGS. 19C and 19D are cross-sectional side views depicting overlapping plated through-holes 1910 and 1908 in a mother PCB 1302 and daughter PCB 1702, respectively, in which the smaller through-hole 1908 of the daughter PCB 1702 has an annular ring 1904 having a larger diameter relative to through-hole 1804 of FIG. 19A. FIG. 19C depicts plated through-holes 1910 and 1908 as being slightly misaligned (i.e., the centerlines of the through-holes 1910 and 1908 are not precisely aligned). Because of the larger diameter of annular ring 1904, electrical contact is still maintained between the conductive plating of the two plated through-holes 1908 and 1910. FIG. 19D depicts the two holes after injection of solder 1906. Even when the plated through-holes 1908 and 1910 are slightly misaligned, the larger annular ring 1904 allows for proper bonding between the solder and the plated through-holes 1908 and 1910.

Figure 20B:
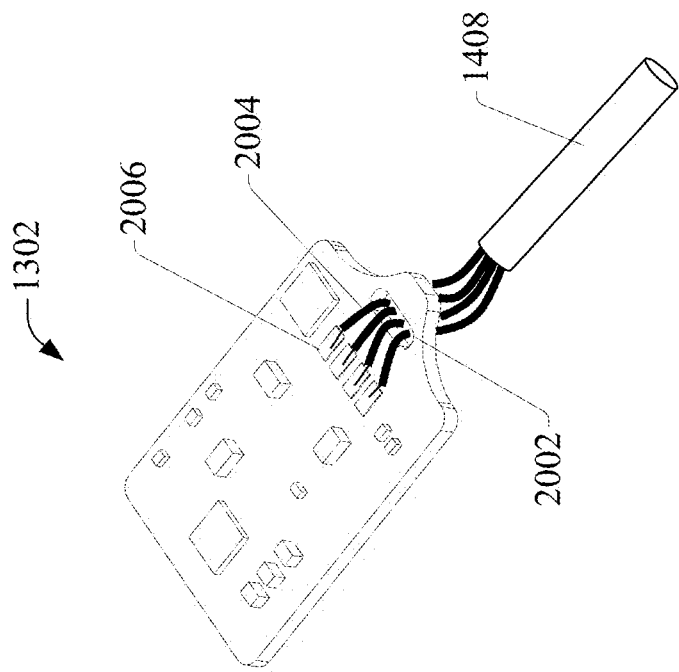
FIG. 20B a three-dimensional view of a PCB including strain relief features depicting conductors of a cable attached to the PCB.
Figure 20A:
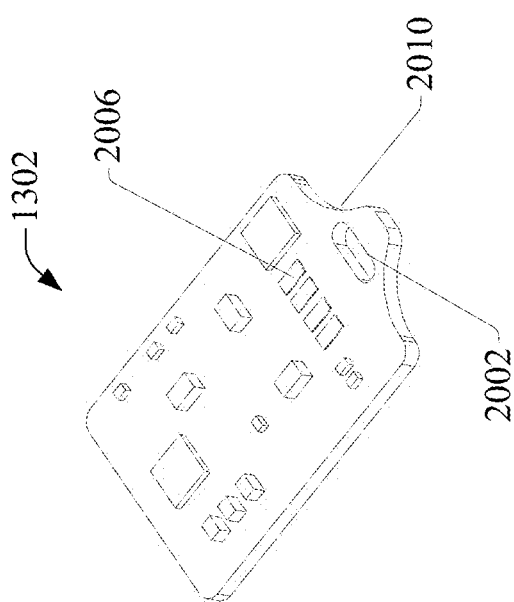
FIG. 20A is a three-dimensional view of a PCB including strain relief features.

FIGS. 20A and 20B are three-dimensional views of PCB 1302 illustrating optional strain relief features. In order to provide additional strain relief for cable 1408, a slot 2002 can be formed near one end of PCB 1302. The slot 2002 can be formed near the end at which the conductors 2004 of cable 1408 will be received by the PCB 1302, and can be positioned on the PCB 1302 between the edge 2010 of the PCB 1302 and a row of solder pads 2006 on which the conductors 2004 of cable 1408 will be connected. As shown in FIG. 20B, conductors 2004 of cable 1408 can pass under the bottom side of the PCB 1302 and be routed upward through slot 2002. The conductors 2004 can then be bent forward and electrically connected (e.g., soldered) to solder pads 2006 on the top side of the PCB 1302. Conductive traces on the PCB 1302 can electrically connect the solder pads 2006 to the appropriate electronic components of PCB 1302 in accordance with the circuit design.

Slot 2002 can be sized to have a sufficient length and width to accommodate the diameter and number of cable conductors 2004 that will be landed on the PCB 1302. For example, the width of slot 2002 can be approximately 1.5 times larger than the diameter of one of the conductors 2004, ensuring that the conductors 2004 fit snuggly within the slot 2002.

Bending the cable conductors 2004 through slot 2002 can provide additional strain relief for the termination points between the conductors 2004 and solder pads 2006 when the cable 1408 is subjected to a tensile load. This technique requires no additional components or moving parts to provide strain relief, making the technique suitable for applications in which internal space is limited, or in cases in which external strain relief is not desired.

Figure 21B:
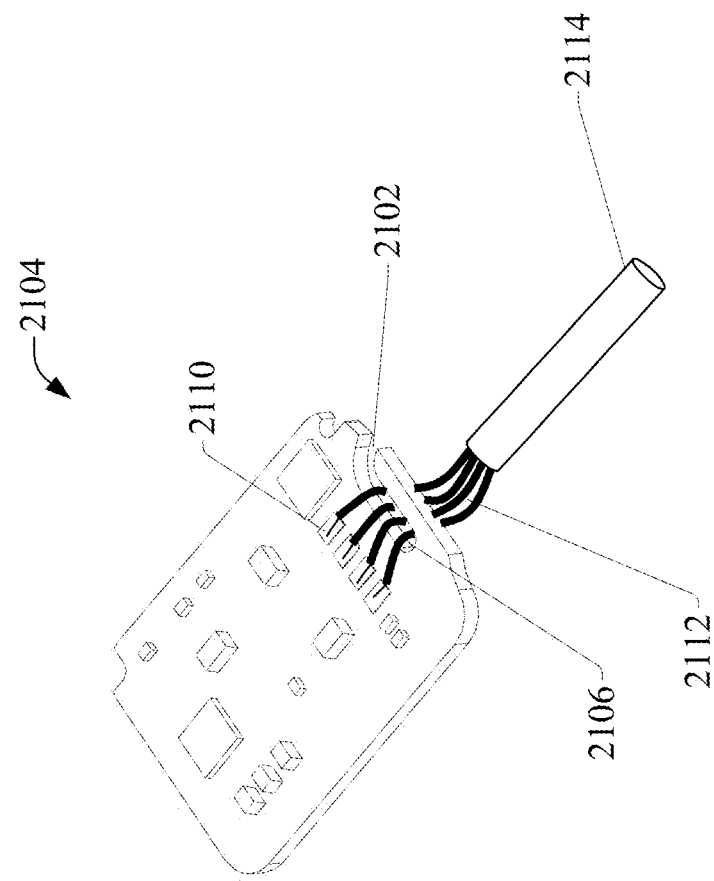
FIG. 21B is a three-dimensional view of a PCB that includes an alternative strain relief formation depicting conductors of a cable attached to the PCB.
Figure 21A:
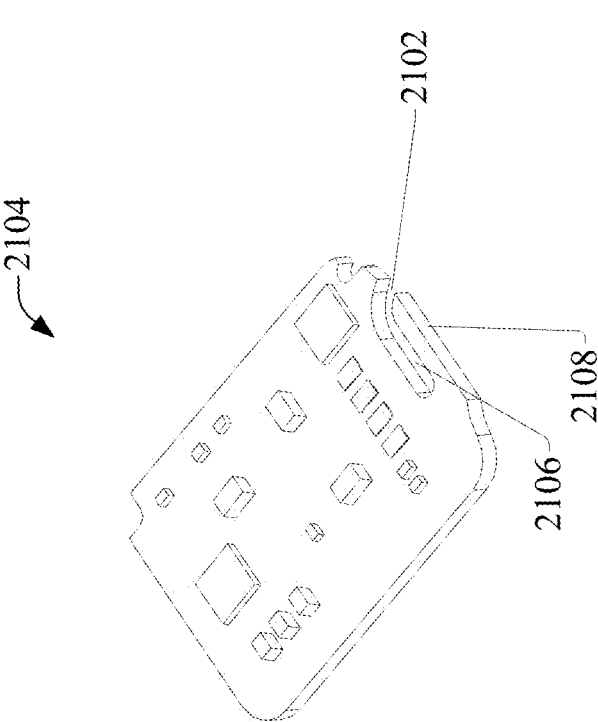
FIG. 21A is a three-dimensional view of a PCB that includes an alternative strain relief formation.

FIG. 21A is a three-dimensional view of a PCB 2104 that includes an alternative strain relief formation. In this example, strain relief slot 2106 formed near the lower edge 2108 of PCB 2104 curves at one end and continues to the lower edge 2108, creating an opening 2102 through which wires can be inserted more quickly into the slot during assembly relative to a slot with no opening. FIG. 21B is a three-dimensional view of PCB 2104 depicting conductors 2112 of a cable 2114 passing through slot 2106 from a bottom side of the PCB 2104 before being electrically connected to solder pads 2110 on the top side of the PCB 2104. Slot 2106 is long and wide enough to accommodate the diameter and number of conductors that will pass through. For example, in some embodiments the width of the slot 2106 can be approximately 1.5 times greater than the diameter of conductors 2112. The curved shape of slot 2106 can limit lateral movement of the conductors 2112, preventing the conductors from sliding out of the slot prior to being soldered to the solder pads 2110. As in the embodiment described above in connection with FIGS. 20A and 20B, the conductors 2112 can be bent at approximate right angles as the conductors pass through the slot 2106.

Figure 22B:
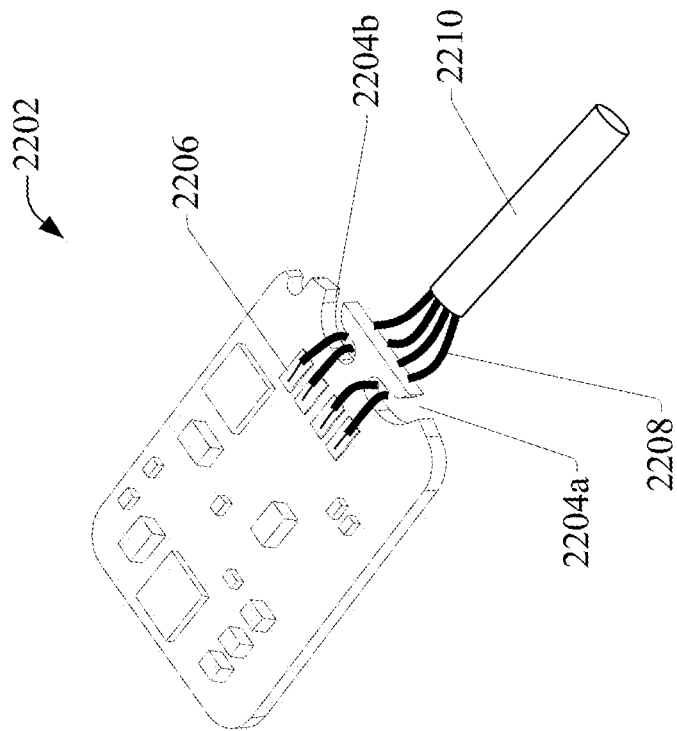
FIG. 22B is a three-dimensional view of a PCB that includes another alternative strain relief formation depicting conductors of a cable attached to the PCB.
Figure 22A:
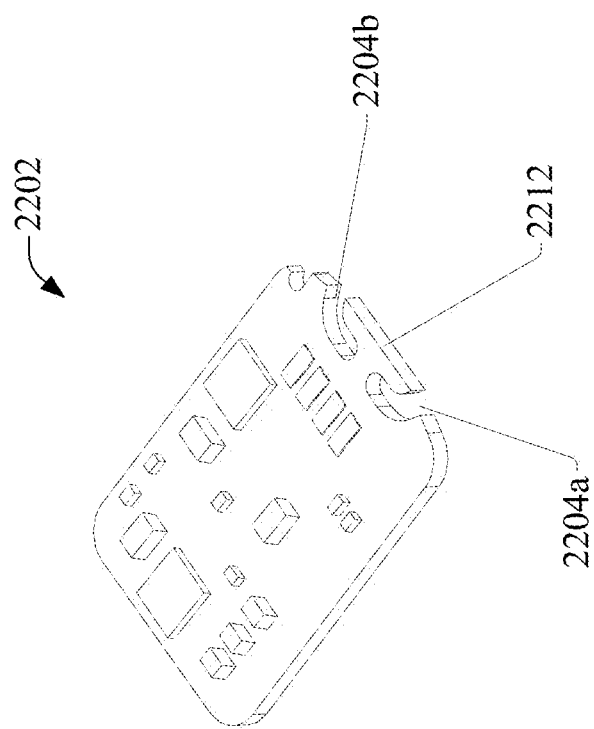
FIG. 22A is a three-dimensional view of a PCB that includes another alternative strain relief formation.

FIG. 22A is a three-dimensional view of a PCB 2202 that includes another alternative strain relief formation. In this example, PCB 2202 includes two slots 2204*a* and 2204*b* that are curved to form openings at an edge 2212 of the PCB 2202, similar to slot 2106 of FIGS. 21A and 21B. FIG. 22B is a three-dimensional view of PCB 2202 with conductors 2208 of a cable 2210 passing through the slots 2204*a* and 2204*b* before being electrically connected to solder pads 2206 on the PCB 2202. In the example depicted in FIG. 22B, the cable 2210 comprises four conductors, which are divided evenly between the two slots 2202*a* and 2204*b* (two conductors per slot).

The single-flange design of bobbin 802 described herein yields a smaller bobbin profile relative to bobbins having two or more flanges, allowing the bobbin to be installed in smaller devices. The design allows bobbin 802 to be fabricated such that the parting lines or flash caused by the injection molding process are formed solely on the edge of the flange, where these artifacts of the manufacturing process will not interfere with coil windings and cause irregular or asymmetric windings. The design of also allows for the injection molding tool to be separated without the need to draft flanges, further facilitating regular and symmetrical windings.

Bobbin 802 was described above as being used to hold a specifically designed coil architecture comprising an inner transmitter coil (or portion of a transmitter coil) and an outer receiver coil wound over the transmitter coil in a concentric fashion. However, it is to be appreciated that bobbin 802 can be used to hold substantially any type of coil or coil assembly. For example, in some embodiments a transmitter coil can be mounted on one side of flange 806 while a receiver coil can be mounted on the other side of flange 806.

Figure 23A:
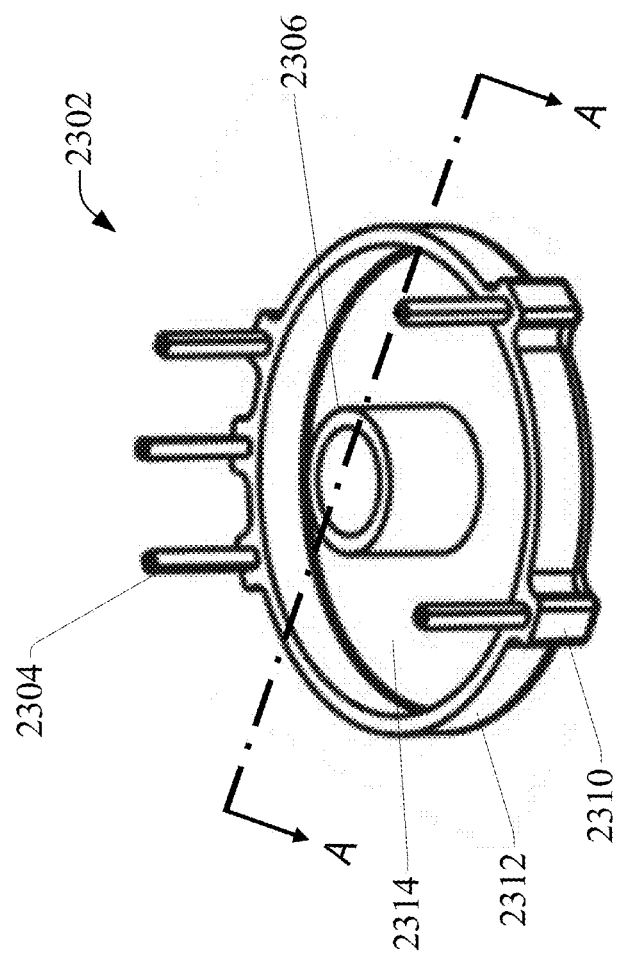
FIG. 23A is a three-dimensional view of an example bobbin.
Figure 23B:
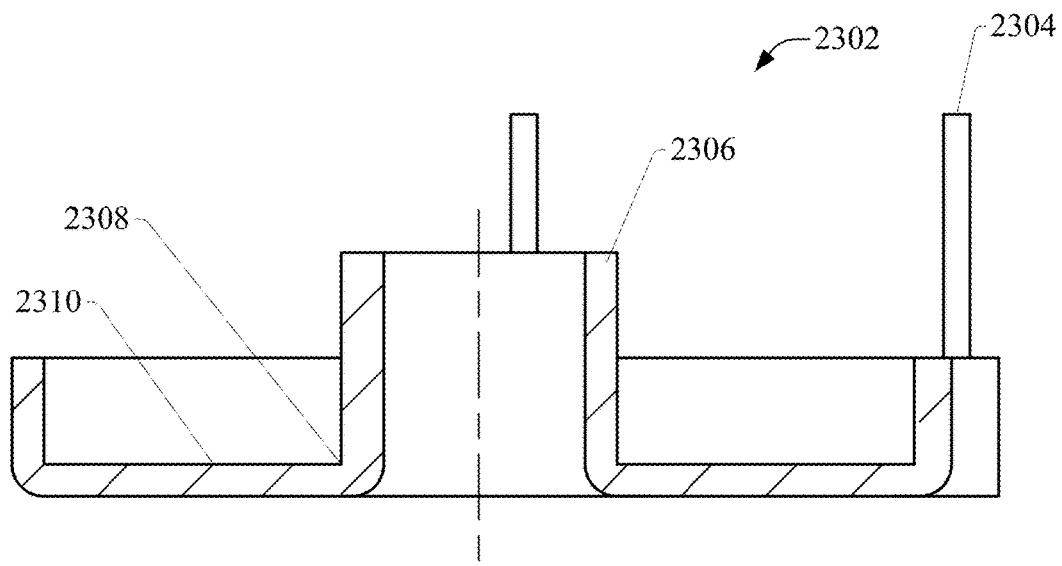
FIG. 23B is a cross-sectional side view of an example bobbin.

FIGS. 23A-23B illustrate an alternative bobbin 2302 that shares a number of benefits with bobbin 802. FIG. 23A is a three-dimensional view of bobbin 2302, and FIG. 23B is a cross-sectional side view of bobbin 2302. In this embodiment, bobbin 2302 is shaped like a cup with a center hub 2306 protruding upward from the center of the cup. Hub 2306 protrudes from the center or approximate center of the round bobbin floor 2314. A wall 2312 extends upwardly along the perimeter of the bobbin floor 2314. As shown in FIG. 23B, a sharp corner 2308 is formed along the intersection where the center hub 2306 meets the floor 2314 of the bobbin 2302. Protrusions 2310 extend radially outward from an outside surface of wall 2312 at multiple locations, each protrusion 2310 holding a vertically oriented metal pin 2304 that extends upwardly.

Figure 23C:
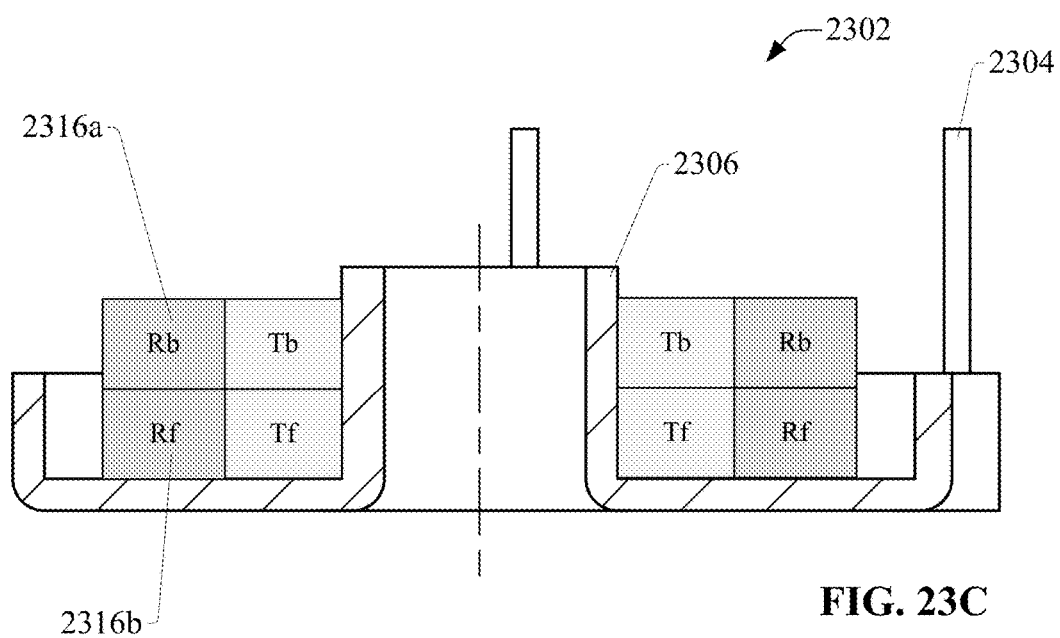
FIG. 23C is a cross-sectional side view of an example bobbin with two coil assemblies installed thereon.

FIG. 23C is a cross-sectional side view of bobbin 2302 with two coil assemblies 2316*a* and 2316*b* installed thereon. Coil assembly 2316*a* is a back coil assembly, and coil assembly 2316*b* is a front coil assembly. Back coil assembly 2316*a* sits on top of front coil assembly 2316*b*, as there is no flange to separate the two coil assemblies in this embodiment. The stacked coil assemblies 2316*a* and 2316*b* reside within the cup formation of bobbin 2302 surrounding center hub 2306. As in previous examples, each coil assembly comprises an inner transmitter coil (coils Tb and Tf) and an outer receiver coil (coils Rb and Rf).

Figure 23D:
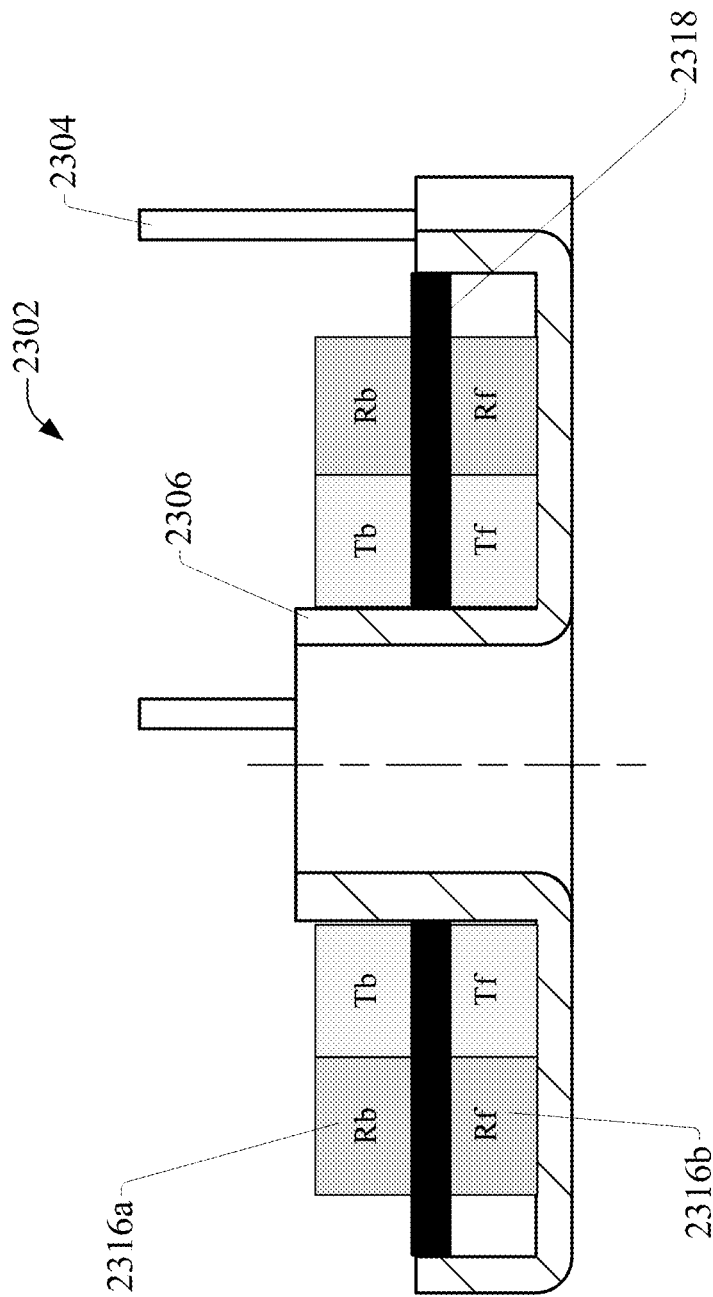
FIG. 23D is another cross-sectional side view of an example bobbin having installed thereon a front coil assembly and a rear coil assembly with a spacer installed between the two coil assemblies.

Bobbin 2302 can be made of a suitable plastic resin that prevents the coils Rb, Tb, Rf, and Tf from making direct contact with the metal sensing face of the sensor housing. The bobbin 2302 ensures that the coil assemblies are always located at a fixed distance away from the sensing face of the sensor; namely, the distance corresponding to the thickness of the floor 2314. FIG. 23D is another cross-sectional side view of bobbin 2302 in which a spacer 2318 has been installed between the front coil assembly and the rear coil assembly. Spacer 2318 can create a gap between the two coil assemblies through which the coil lead wires of the front coil assembly 2316*b* can be routed. This can prevent the coil lead wires from the front coil assembly 2316*b* from making contact with either the interior surface of the bobbin 2302 or the back coil assembly 2316, which may otherwise cause the coil assemblies to be tilted with respect to one another. Spacer 2318 can be made of any suitable plastic resin.

The thickness of the spacer 2318 also determines the spacing between the two coil assemblies 2316*a* and 2316*b*. As the thickness of the spacer 2318 increases, the coil assemblies 2316*a* and 2316*b* are positioned further apart. Spacing the coil assemblies farther apart can yield a stronger signal, but may also increase the negative influence of surrounding metals. On the other hand, as the thickness of the spacer 2318 decreases, the coil assemblies 2316*a* and 2316*b* are positioned closer together. Reducing the spacing between the coil assemblies 2316*a* and 2316*b* can reduce surrounding metal effects, but with a possible decrease in signal response from the intended target. The thickness of the spacer 2318 is thus a tradeoff between target response and surrounding metal influences.

Figure 24:
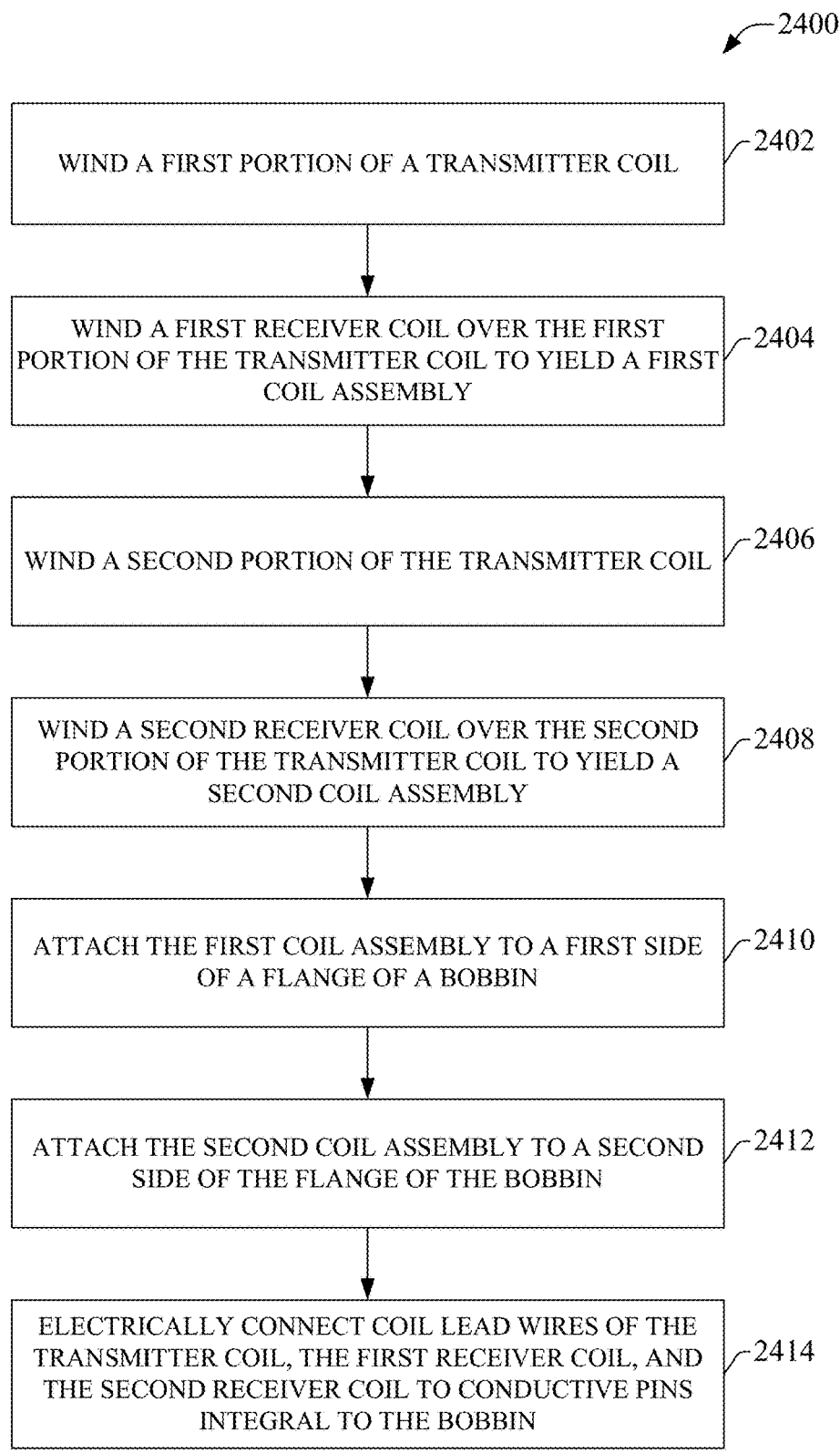
FIG. 24 is a flowchart of an example methodology for assembling an architecture of coil windings for use in an inductive sensor or other device.
Figure 25:
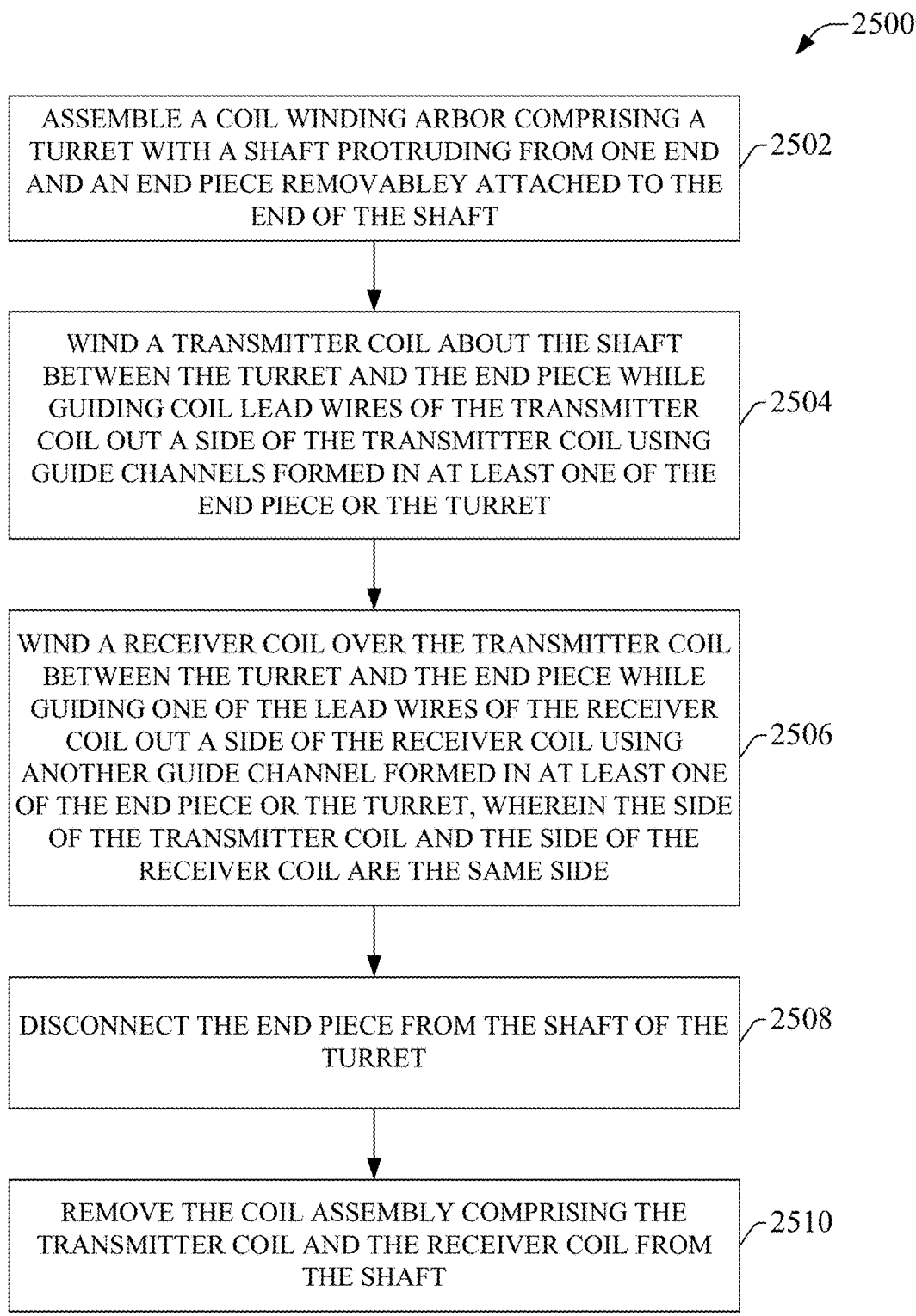
FIG. 25 is a flowchart of an example methodology for winding a coil assembly.

FIGS. 24-25 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 24 illustrates an example methodology 2400 for assembling an architecture of coil windings for use in an inductive sensor or other device. Initially, at 2402, a first portion of a transmitter coil is wound. At 2404, a first receiver coil is wound over the first portion of the transmitter coil to yield a first coil assembly. The first coil assembly thus comprises a first portion of a transmitter coil and a first receiver coil arranged concentrically.

At 2406, a second portion of the transmitter coil is wound. The second portion and the first portion of the transmitter coil can comprise an equal or substantially equal number of turns, such that the turns of the transmitter coil are substantially equally divided between the first portion and the second portion. At 2408, a second receiver coil is wound over the second portion of the transmitter coil to yield a second coil assembly. The second coil assembly thus comprises the second portion of the transmitter coil and the second receiver coil arranged concentrically.

At 2410, the first coil assembly is attached to a first side of a flange of a bobbin. The flange can extend radially from a central hub of the bobbin, such that the first coil assembly can be attached to the first side of the flange by sliding a first end of the hub through the inner hole of the first portion of the transmitter coil until the first coil assembly rests flush or substantially flush against the first side of the flange.

At 2412, the second coil assembly is attached to a second side of the flange of the bobbin, the second side being opposite the first side. The second coil assembly can be attached to the second side by sliding a second end of the hub (opposite the first end) through the inner hole of the second portion of the transmitter coil until the second coil assembly rests flush or substantially flush against the second side of the flange.

At 2414, coil lead wires of the transmitter coil, the first receiver coil, and the second receiver coil are electrically connected to conductive pins integral to the bobbin. In some embodiments, the pins can protrude from locations near the outer edge of the flange, extending substantially perpendicular to a surface of the flange. The coil lead wires can exit the coils from the side of the coil assemblies that face away from the flange so that the wires can be connected to the pins without being routed between the coil assemblies and the flange.

FIG. 25 illustrates an example methodology 2500 for winding a coil assembly. Initially, at 2502, a coil winding arbor is assembled comprising a turret with a shaft protruding from one end of the turret, and an end piece removably attached to the end of the shaft. At 2504, a transmitter coil is wound about the shaft between the turret and the end piece while coil lead wires of the transmitter coil are guided out from a side of the transmitter coil using guide channels formed in at least one of the end piece or the turret.

At 2506, a receiver coil is wound over the transmitter coil between the turret and the end piece while guiding one of the lead wires of the receiver coil out from a side of the receiver coil using another guide channel formed in at least one of the end piece or the turret. The side of the receiver coil out of which the coil lead wires are guided is the same as the side of the transmitter coil out of which the transmitter coil lead wires are guided in step 2504.

At 2508, the end piece is disconnected from the shaft of the turret. At 2510, the resulting coil assembly comprising the transmitter coil and the receiver coil is removed from the shaft.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques.

What is claimed is:

1. An assembly for supporting inductive coils, comprising:
   a bobbin comprising
      a central hub,
      a single flange that extends radially from the central hub, and
      at least one conductive pin that extends perpendicular to a surface of the flange,
   wherein the at least one conductive pin is located at or near an outer edge of the flange.

2. The assembly of claim 1, wherein the bobbin further comprises at least one standoff that extends perpendicular to a surface of the flange, and wherein the at least one standoff is located at or near an outer edge of the flange.

3. The assembly of claim 1, wherein an interface between the flange and the central hub comprises a corner.

4. The assembly of claim 1, further comprising:
   a first coil assembly mounted on a first side of the flange; and
   a second coil assembly mounted on a second side of the flange, wherein the second side is opposite the first side.

5. The assembly of claim 4, wherein
   a first side of the central hub that protrudes from the first side of the flange passes through a first hole of the first coil assembly,
   a second side of the central hub that protrudes from the second side of the flange passes through a second hole of the second coil assembly,
   a first rear side of the first coil assembly abuts against the first side of the flange, and
   a second rear side of the second coil assembly abuts against the second side of the flange.

6. The assembly of claim 5, wherein
   the first coil assembly has a height that is less than a distance between the first side of the flange and a first end of the first side of the central hub, and
   the second coil assembly has height that is less than a second distance between the second side of the flange and a second end of the second side of the central hub.

7. The assembly of claim 4, wherein
   the first coil assembly comprises
      a first transmitter coil mounted on the first side of the flange and oriented concentrically with the central hub, the first transmitter coil having a first outside diameter, and
      a first receiver coil mounted on the first side of the flange and oriented concentrically with the central hub, the first receiver coil having a first inside diameter that is substantially equal to or larger than the first outside diameter of the first transmitter coil, and the second coil assembly comprises
      a second transmitter coil mounted on the second side of the flange and oriented concentrically with the central hub, the second transmitter coil having a second outside diameter, and
      a second receiver coil mounted on the second side of the flange and oriented concentrically with the central hub, the second receiver coil having a second inside diameter that is substantially equal to or larger than the second outside diameter of the second transmitter coil.

8. The assembly of claim 7, wherein the first transmitter coil and the second transmitter coil are electrically connected together in series.

9. The assembly of claim 4, wherein the first coil assembly and the second coil assembly comprise coil assemblies of an inductive sensor.

10. A method, comprising:
    winding a transmitter coil;
    winding a receiver coil concentrically over the transmitter coil to yield a coil assembly; and
    attaching the coil assembly to a bobbin to yield a bobbin/coil assembly,
    wherein the bobbin comprises a central hub, a single flange that extends radially from the central hub, and at least one conductive pin that extends perpendicular to a surface of the flange, wherein the at least one conductive pin is located at or near an outer edge of the flange.

11. The method of claim 10, wherein the attaching comprises attaching the coil assembly to a side of the flange concentrically with the central hub.

12. The method of claim 11, wherein the transmitter coil is a first transmitter coil, the receiver coil is a first receiver coil, and the coil assembly is a first coil assembly, and the method further comprises:
    winding a second transmitter coil;
    winding a second receiver coil concentrically over the second transmitter coil to yield a second coil assembly; and
    attaching the second coil assembly to another side of the flange concentrically with the central hub.

13. The method of claim 12, wherein the winding the first transmitter coil and the winding the second transmitter coil comprise electrically connecting the first transmitter coil and the second transmitter coil in series.

14. The method of claim 10, further comprising electrically connecting coil lead wires of the transmitter coil and the receiver coil to respective conductive pins, including the at least one conductive pin, that extend perpendicular to a surface of the flange, wherein the respective conductive pins are positioned at or near the outer edge of the flange.

15. The method of claim 14, further comprising installing the bobbin/coil assembly in a housing of an inductive sensor, wherein the installing comprises
    installing the bobbin/coil assembly between an interior surface of a sensing face of the housing and a printed circuit board inside the housing, and
    electrically connecting the conductive pins to respective electrical components of the printed circuit board.

16. The method of claim 14, wherein the printed circuit board is a first printed circuit board, and wherein the method further comprises:
    stacking the first printed circuit board on a second printed circuit board such that a first plated hole of the first printed circuit board is aligned with a second plated hole of the second printed circuit board, wherein the first plated hole has a smaller diameter than the second plated hole; and injecting solder into the second plated hole.

17. An inductive sensor, comprising:
a sensor housing;
a printed circuit board comprising one or more electrical components of the inductive sensor;
a bobbin installed between an inside surface of the sensor housing and the printed circuit board, the bobbin comprising a central hub, a single flange that extends radially from the central hub, and at least one conductive pin located at or near an outer edge of the single flange and that extends perpendicular to a surface of the single flange; and
at least one coil assembly installed on the bobbin.

18. The inductive sensor of claim 17, wherein a first side of the at least one coil assembly is attached to a side of the single flange concentrically with the central hub.

19. The inductive sensor of claim 18, wherein the printed circuit board comprises at least one slot near an edge of the printed circuit board, wherein one or more conductors of a cable pass through the slot from a bottom side of the printed circuit board and are electrically connected to one or more solder pads on a top side of the printed circuit board.

20. An assembly, comprising:
a bobbin comprising a central hub and a single flange that extends radially from the central hub,
a first coil assembly mounted on a first side of the flange; and
a second coil assembly mounted on a second side of the flange, wherein the second side is opposite the first side,
wherein
a first side of the central hub that protrudes from the first side of the flange passes through a first hole of the first coil assembly,
a second side of the central hub that protrudes from the second side of the flange passes through a second hole of the second coil assembly,
a first rear side of the first coil assembly abuts against the first side of the flange,
a second rear side of the second coil assembly abuts against the second side of the flange,
the first coil assembly has a height that is less than a distance between the first side of the flange and a first end of the first side of the central hub, and
the second coil assembly has height that is less than a second distance between the second side of the flange and a second end of the second side of the central hub.

21. An assembly, comprising:
a bobbin comprising a central hub and a single flange that extends radially from the central hub;
a first coil assembly mounted on a first side of the flange; and
a second coil assembly mounted on a second side of the flange, wherein the second side is opposite the first side,
wherein
the first coil assembly comprises
a first transmitter coil oriented concentrically with the central hub, the first transmitter coil having a first outside diameter, and
a first receiver coil oriented concentrically with the central hub, the first receiver coil having a first inside diameter that is substantially equal to or larger than the first outside diameter of the first transmitter coil, and the second coil assembly comprises
a second transmitter coil oriented concentrically with the central hub, the second transmitter coil having a second outside diameter, and
a second receiver coil oriented concentrically with the central hub, the second receiver coil having a second inside diameter that is substantially equal to or larger than the second outside diameter of the second transmitter coil.

22. An inductive sensor, comprising:
a sensor housing;
a printed circuit board comprising one or more electrical components of the inductive sensor;
a bobbin installed between an inside surface of the sensor housing and the printed circuit board, the bobbin comprising a central hub and a single flange that extends radially from the central hub; and
at least one coil assembly installed on the bobbin.
wherein
a first side of the at least one coil assembly is attached to a side of the single flange concentrically with the central hub,
the printed circuit board comprises at least one slot near an edge of the printed circuit board, and
one or more conductors of a cable pass through the slot from a bottom side of the printed circuit board and are electrically connected to one or more solder pads on a top side of the printed circuit board.

\* \* \* \* \*